(12) United States Patent
Nabe et al.

(10) Patent No.: US 7,305,364 B2
(45) Date of Patent: Dec. 4, 2007

(54) METHODS AND SYSTEMS FOR SUPPLYING CUSTOMER LEADS TO DEALERS

(75) Inventors: Oumar Nabe, New York, NY (US); David J. Fogarty, Riverside, CT (US); Ian R. Bell, Peebles (GB); Balwinder S. Samra, Yorkshire (GB)

(73) Assignee: General Electric Capital Corporation, Stamford, CT (US)

( * ) Notice: Subject to any disclaimer, the term of this patent is extended or adjusted under 35 U.S.C. 154(b) by 929 days.

(21) Appl. No.: 09/828,530

(22) Filed: Apr. 6, 2001

(65) Prior Publication Data

US 2002/0194050 A1 Dec. 19, 2002

(51) Int. Cl.
*G06Q 40/00* (2006.01)

(52) U.S. Cl. .............................. 705/37; 705/10; 705/38

(58) Field of Classification Search ................ 700/214; 707/102; 705/7, 10, 37, 38
See application file for complete search history.

(56) References Cited

U.S. PATENT DOCUMENTS

| 5,822,410 | A | * | 10/1998 | McCausland et al. .. 379/114.01 |
| 5,835,896 | A | | 11/1998 | Fisher et al. |
| 5,930,764 | A | | 7/1999 | Melchione et al. |
| 5,956,693 | A | | 9/1999 | Geerlings |
| 5,963,910 | A | | 10/1999 | Ulwick |
| 5,966,695 | A | | 10/1999 | Melchione et al. |
| 6,012,045 | A | | 1/2000 | Barzilai et al. |
| 6,029,068 | A | | 2/2000 | Takahashi et al. |
| 6,049,599 | A | * | 4/2000 | McCausland et al. ....... 379/111 |
| 6,049,782 | A | | 4/2000 | Gottesman et al. |
| 6,061,506 | A | | 5/2000 | Wollaston et al. |
| 6,073,112 | A | | 6/2000 | Geerlings |
| 6,078,892 | A | * | 6/2000 | Anderson et al. ............. 705/10 |
| 6,115,691 | A | | 9/2000 | Ulwick |
| 6,182,054 | B1 | | 1/2001 | Dickinson et al. |
| 6,183,362 | B1 | | 2/2001 | Boushy |
| 6,226,623 | B1 | | 5/2001 | Schein et al. |
| 6,236,975 | B1 | * | 5/2001 | Boe et al. ...................... 705/7 |
| 6,243,691 | B1 | | 6/2001 | Fisher et al. |
| 6,321,206 | B1 | * | 11/2001 | Honarvar ........................ 705/7 |
| 6,338,066 | B1 | * | 1/2002 | Martin et al. ................ 707/102 |
| 6,430,539 | B1 | * | 8/2002 | Lazarus et al. ................ 705/10 |
| 6,539,392 | B1 | * | 3/2003 | Rebane ........................ 707/101 |
| 6,567,814 | B1 | * | 5/2003 | Bankier et al. ............. 707/101 |
| 6,658,391 | B1 | * | 12/2003 | Williams et al. .............. 705/10 |

(Continued)

OTHER PUBLICATIONS

Chou, Paul B.; Grossman, Edna; Gunopulos, Dimitrios; Kamesam, Pasumarti. "Identifying Prospective Customers", 2000. ACM Press. pp. 447-456.*

(Continued)

*Primary Examiner*—Hani M. Kazimi
*Assistant Examiner*—Peter Choi
(74) *Attorney, Agent, or Firm*—Armstrong Teasdale LLP

(57) ABSTRACT

A method is disclosed for generating customer leads for use by dealers attempting to sell a product, for example a loan product. The method is implemented on a system and includes providing a database of customer information, predicting a propensity for one or more customers within the database to respond to an offer, predicting when the customers will respond to the offer, generating a potential customer list, and providing the potential customer list to one or more dealers.

37 Claims, 17 Drawing Sheets

U.S. PATENT DOCUMENTS

| | | | | |
|---|---|---|---|---|
| 6,662,192 | B1* | 12/2003 | Rebane | 707/104.1 |
| 6,839,682 | B1* | 1/2005 | Blume et al. | 705/10 |
| 6,970,830 | B1* | 11/2005 | Samra et al. | 705/10 |
| 2001/0027408 | A1* | 10/2001 | Nakisa | 705/10 |
| 2003/0105658 | A1* | 6/2003 | Chen et al. | 705/10 |

OTHER PUBLICATIONS

Mummert, Hallie. "Who is Worthy?". Apr. 1998. Target Marketing. vol. 21, Issue 4. pp. 34-36.*

Thearling, Kurt. "Increasing Customer Value by Integrating Data Mining and Campaign Management Software". Feb. 1999. Direct Marketing Magazine. vol. 61, Issue 10. pp. 49-53.*

Nathan, Sara. "Chase Using Customer Data Base for Marketing". Apr. 13, 1998. American Banker. p. 12.*

"NCR to Help Businesses Harness Power of Event-Driven Marketing with New-'MarketingAgent' Software". Jun. 8, 1999. PR Newsire.*

"Be Prepared When Meeting the Relations BYLN". Apr. 3, 2000. Precision Marketing. p. 23.*

Messmer, Ellen. "PeopleSoft offers up "Accelerated" PeopleSoft 8 for midsized companies". Jan. 11, 2001. Network World.*

Levin, Nissan; Zahavi, Jacob. "Predictive Modeling Using Segmentation". Spring 2001. Journal of Interactive Marketing. vol. 15, Issue 2. pp. 2-22.*

Egol, Len. "What's new in database marketing software—several products evaluated". Aug. 1994. Primedia Business Magazines & Media Inc.*

Brown, A.J. "A Model for Effective, Customer-Oriented Market Plans". Jul. 1997. Direct Marketing. vol. 60, Issue 3. pp. 40-43.*

"SPSS Data Mining: SPSS delivers the complete data mining solution." Oct. 18, 2000. SPSS Inc.*

Isaac, Steven; Tooker, Richard N. "The Many Faces of CRM". Spring 2001. LIMRA's MarketFacts Quarterly. vol. 20, Issue 1. pp. 84-88.*

Saarenvirta, Gary. "Data Mining for Direct Mail: A Lesson In Predictive Modeling". Mar. 9, 1999. Intelligent Enterprise. vol. 2, Issue 4. p. 41.*

* cited by examiner

METHODS AND SYSTEMS FOR SUPPLYING CUSTOMER LEADS TO DEALERS

BACKGROUND OF THE INVENTION

This invention relates generally to financing, servicing loan customers and more specifically to methods and systems for servicing loan customers through dealers of loan products.

Known customer lead generating systems typically utilize random mailings based on archival data, with little or no attention to trending data or expected incomes. Known modeling solutions are inadequate, because a lifetime probability (a probability for termination in each month in the future of the loan) to prepay loans, described herein as early termination of loans, cannot be accurately computed. Without an accurate lifetime probability, accurate marketing decisions regarding whether the customer is to be offered a promotional or a consolidating offer cannot be made. While customers which would provide high expected incomes for the lender can be sent random mailings with a degree of certainty regarding success of the offer, the calculation of the expected income is only based on a rough approximation. A system without accurate expected income data or lifetime probability for termination does not provide sufficient data for lead development for acquiring new loan business.

BRIEF SUMMARY OF THE INVENTION

Methods and systems for generating customer leads, for example, for use by dealers attempting to sell a product such as a loan product are provided. In an exemplary embodiment, the method comprises providing a database of customer information, predicting a propensity for one or more customers within the database to respond to an offer, predicting when the customers will respond to the offer, generating a potential customer list, and providing the potential customer list to one or more dealers.

Further, a system for generating customer leads for use by dealers attempting to sell a product is provided which comprises one or more databases of customer information, a server, a network, and at least one computer connected to the server via the network. The server is configured to predict a propensity for one or more customers within said database to respond to an offer, predict when the customers will respond to the offer, generate a potential customer list, and provide the potential customer list to one or more dealers.

In one aspect, a computer is provided which is programmed to prompt a user to select customer characteristics to apply to a propensity model for a determination of which customers within a customer database will respond an offer, prompt a user for a time when the offer will be presented to customers, and generate a potential customer list.

In another aspect, a database is provided which comprises data corresponding to at least one of active and inactive customers, data corresponding to customers propensity to respond to an offer and data corresponding to a time when a customer will respond to an offer.

In yet another aspect, a computer readable medium is provided which comprises at least one record of customer information, a plurality of rules for identifying which customers have a propensity to respond to an offer, a plurality of rules for determining a time when customers will respond to the offer, and a record of potential customers.

In a further aspect a method for providing a list of customer leads to dealers attempting to sell a product is provided which comprises the steps of generating a database of customer information, selecting, from an electronic interface, customer characteristics within the database to apply to a propensity model for identifying customers likely to respond to an offer, selecting, from the electronic interface, a time when the offer will be presented to customers, requesting, from the electronic interface, a potential customer list, and delivering the customer list to at least one dealer.

In still another aspect an apparatus comprises means for storing a database of customer information, means for identifying customers with a propensity to respond to an offer, means for identifying a time when a customer will respond to an offer, means for generating a potential customer list of customers likely to respond to an offer and the time which they are likely to respond to the offer, and means for delivering the potential customer list to at least one dealer.

BRIEF DESCRIPTION OF THE DRAWINGS

FIG. 12 is a user screen showing account generation by dealer office;

FIG. 13 is a user screen showing a modeling output of customer prospects;

FIG. 14 is a user screen showing specific information for one customer prospect;

DETAILED DESCRIPTION OF THE INVENTION

Methods and systems for identifying customers likely to prepay, that is, early terminate their loan contracts before the contracts expire are described below. Customers with a propensity to early terminate are identified using an early termination model, which is configured to predict a probability of early termination for customers based on customer characteristics, for example, age, gender, and income. After probabilities are determined, expected incomes for a lender from a customer are predicted, using the probability information, for a loan and a decision is made whether to offer the customer refinancing or an additional loan offer, in order to retain the customer as a loan customer.

In addition, methods and systems are described which are configured to use models to determine which of a database of inactive customers have a propensity to make a purchase and the timing of such a purchase. By having an accurate prediction, a dealer of products is able to target the right customer, at the right time, with the right product, before the customer makes their intentions known. The models use as inputs, customer demographic data and other inputs to determine a probability that a future purchase will be made. By offering lists of high probability customers to a dealer of products, a lender is in a position to secure the financing of the products. While stated as an offer to inactive customers, the methods and system described are applicable to those active customers, ready to make additional purchases, for example, the auto loan customers, with a propensity to make a second auto purchase.

Dealers will pay lenders for generating customer lists which have high probabilities of success in attracting or retain business. A lender generating such a prospect pool, has an opportunity to maximize profit on the customer list by auctioning the list to the dealers of products. Methods and systems for such an auctioning are described.

The identification and retention of customers is not limited to the customer with a propensity to make purchases which require the taking of a loan. Methods and systems are described herein, where in a retail environment, holders of credit accounts are targeted, in the hope of generating additional purchases, which profit both the retail store and the financial institution through which the store accounts are serviced. By managing the customer relationship through models, again based mostly upon customer demographics, a retailer is able to determine which customers are likely to make only an initial purchase using the store account and those customers who will allow the account to go dormant.

Figure 1:
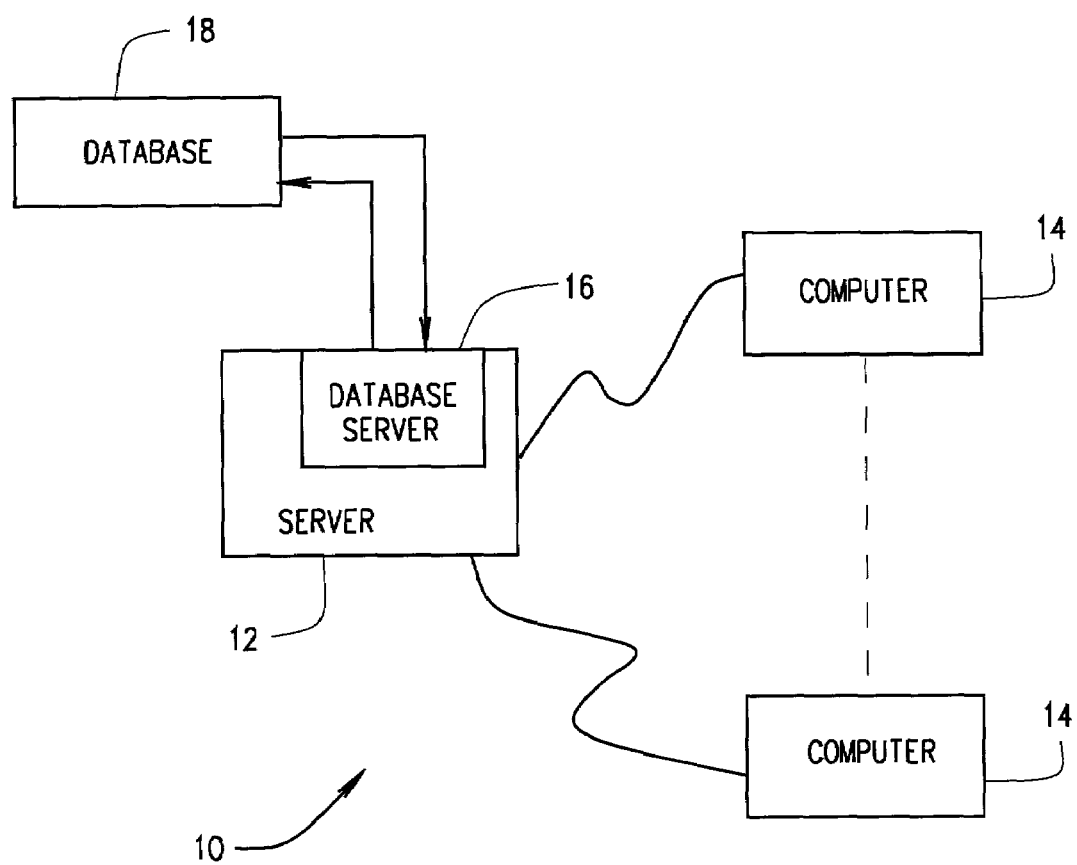
FIG. 1 is a system diagram.

More specifically, FIG. 1 is a block diagram of a system 10 that includes a server sub-system 12, sometimes referred to herein as server 12, and a plurality of customer devices 14 connected to server 12. Computerized modeling and grouping tools, as described below in more detail, are stored in server 12 and can be accessed by a requester at any one of computers 14. In one embodiment, devices 14 are computers including a web browser, and server 12 is accessible to devices 14 via a network such as an intranet or a wide area network such as the Internet. In an alternative embodiment, devices 14 are servers for a network of customer devices. Computer 14 could be any client system capable of interconnecting to the Internet including a web based digital assistant, a web-based phone or other web-based connectable equipment. In another embodiment, server 12 is configured to accept information over a telephone, for example, at least one of a voice responsive system where a user enters spoken data, or by a menu system where a user enters a data request using the touch keys of a telephone as prompted by server 12.

Devices 14 are interconnected to the network, such as a local area network (LAN) or a wide area network (WAN), through many interfaces including dial-in-connections, cable modems and high-speed lines. Alternatively, devices 14 are any device capable of interconnecting to a network including a web-based phone or other web-based connectable equipment. Server 12 includes a database server 16 connected to a centralized database 18. In one embodiment, centralized database 18 is stored on database server 16 and is accessed by potential customers at one of customer devices 14 by logging onto server sub-system 12 through one of customer devices 14. In an alternative embodiment centralized database 18 is stored remotely from server 12.

Figure 2:
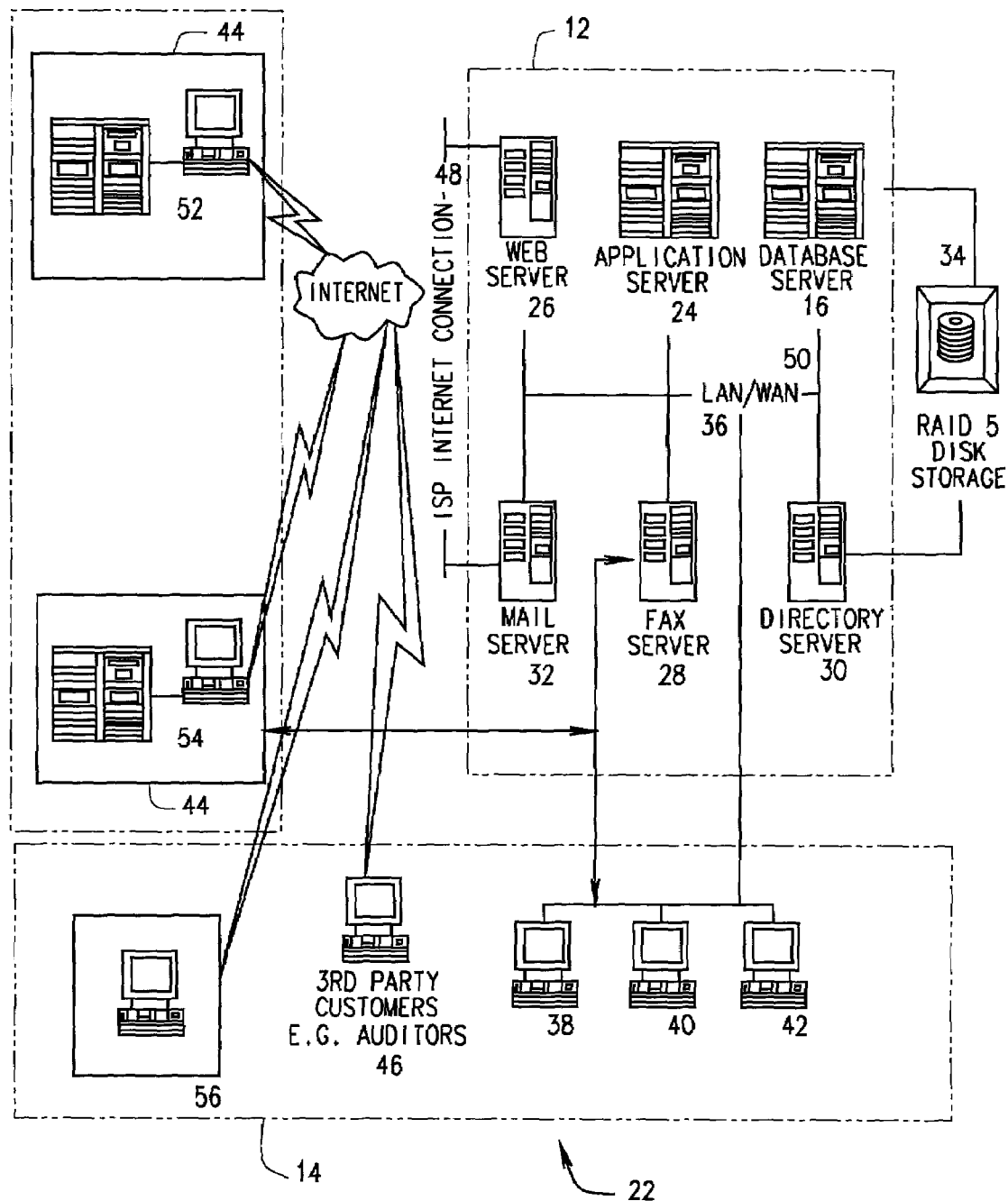
FIG. 2 is a block diagram of a network based system.

FIG. 2 is a block diagram of a network based system 22. System 22 includes server sub-system 12 and customer devices 14. Server sub-system 12 includes database server 16, an application server 24, a web server 26, a fax server 28, a directory server 30, and a mail server 32. A disk storage unit 34 incorporating a computer-readable medium is coupled to database server 16 and directory server 30. Servers 16, 24, 26, 28, 30, and 32 are coupled in a local area network (LAN) 36. In addition, a system administrator work station 38, a work station 40, and a supervisor work station 42 are coupled to LAN 36. Alternatively, work stations 38, 40, and 42 are coupled to LAN 36 via an Internet link or are connected through an intranet.

Each work station 38, 40, and 42 is a personal computer including a web browser. Although the functions performed at the work stations typically are illustrated as being performed at respective work stations 38, 40, and 42, such functions can be performed at one of many personal computers coupled to LAN 36. Work stations 38, 40, and 42 are illustrated as being associated with separate functions only to facilitate an understanding of the different types of functions that can be performed by individuals having access to LAN 36.

Server sub-system 12 is configured to be communicatively coupled to various individuals or employees 44 and to third parties, e.g., customer, 46 via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 50, local area network 36 could be used in place of WAN 50.

In the exemplary embodiment, any employee 44 or customer 46 having a work station 52 can access server sub-system 12. One of customer devices 14 includes a work station 54 located at a remote location. Work stations 52 and 54 are personal computers including a web browser. Also, work stations 52 and 54 are configured to communicate with server sub-system 12. Furthermore, fax server 28 communicates with employees 44 and customers 46 located outside the business entity and any of the remotely located customer systems, including a customer system 56 via a telephone link. Fax server 28 is configured to communicate with other work stations 38, 40, and 42 as well.

The systems described in FIGS. 1 and 2 are configured with various models, described below, which are utilized to identify customers likely to early terminate their loan contracts, to attempt to retain the customer with other products. In addition, the models are used to identify high probability customers to which other financial products may be sold, and further, to cluster identified high probability customers into groups. In one embodiment, after clustering, the groups of customers and individual customers are auctioned, for example, based on a probability determined by the models to dealers of products. Other models have outputs which are utilized to analyze historical retail customer data, and to prepare campaigns to get the retail customer to spend in other areas and through alternative purchasing mediums, for example via the internet. Still other models are configured to determine which inactive customers might be interested in new purchases, for example, auto or retail. Models are implemented as rules within the computer-readable medium of disk storage unit 34.

In another method utilized to retain customers or attract new customers, a lender offers other loan products, for example, a loan for a new vehicle or a loan for a second vehicle. By cross-selling other loan and loan related products, for example, insurance, auto service contracts, mortgages and any purpose loans, either directly or through a dealer, the lender reduces the chances that the borrower will terminate the existing loan early.

As another example, at any stage of an existing loan, a customer may be interested in buying an additional vehicle. In one embodiment, using historical data, modeling is used to predict which customers are most likely to respond to an additional vehicle cross-sell, and therefore dealers can target a mailing/telesales cross-sell campaign accordingly. Additionally, some customers will take out a loan for a vehicle and then wish to switch to a leasing arrangement. Analyses performed on the historical data determines which customers are likely to respond to a "loan-to-lease" offer and they are targeted accordingly. An additional way of increasing profitability, is to offer the customer an opportunity to take out a further loan, for example to buy accessories or pay for repairs. Historical data is used to predict which customers are most likely to respond to such an offer, and they are targeted for a pro-active selling campaign.

Figure 3:
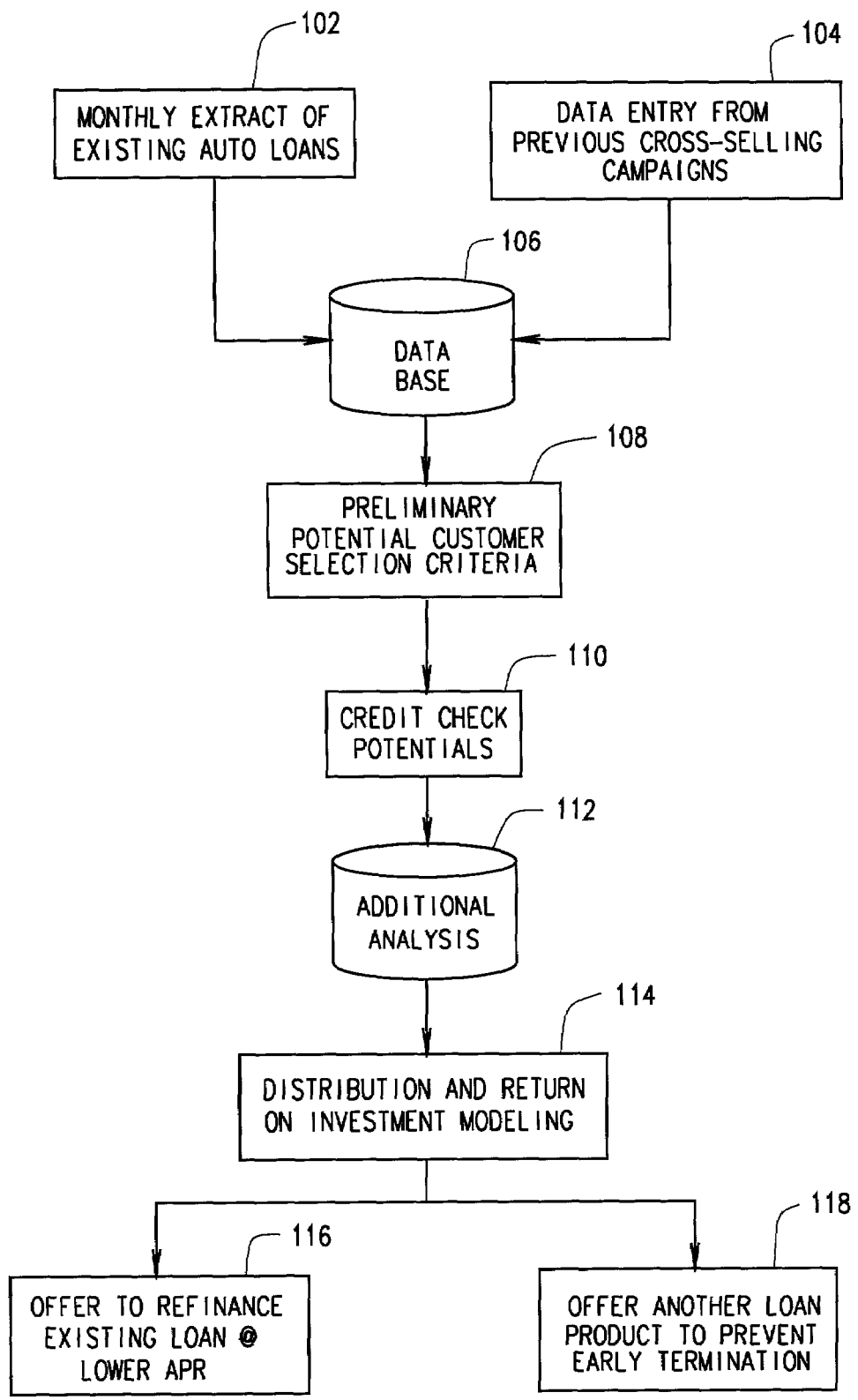
FIG. 3 is a flowchart diagramming a process for identifying customers with a potential to early terminate an existing loan.

FIG. 3 is a flowchart 100 depicting a process for identifying potential customers that may be considering an early termination to their existing loan using an early termination model. In addition, the process is utilized in a customer retention program, targeting existing loan customers for a loan cross sell, a refinance of an existing loan or other services as described above in order to retain the customer. For simplicity, flowchart 100 assumes the existing loans are auto loans, although flowchart 100 should not be considered as being so limited. First, customer data and loan data, for example, income, payment histories and any overpayments, are extracted 102 concerning existing loans and data from earlier loan campaigns 104, for example, customer acceptance or non-acceptance of previous offers, is entered into a loan database 106. Data within database 106 is compared to business exclusion criteria 108, for example, where customer data indicates that a vehicle purchase has taken place within the last six months or is determined to be a cash buyer, to provide a preliminary list of the most promising potential customers. Preliminary potential customers targeted for retention have their credit checked 110 and an expected income from a customer is calculated. Further analysis 112 performed, using customer data, of the customers on the preliminary customer list determines which customers have a high probability to early terminate and which customers have paid off most of their interest payments. After analysis 112, the customer data associated with the preliminary customer list is analyzed using a distribution and return on investment model 114 to ensure that the lender is justified in offering one of a refinance 116 or other loan products 118 and that the customers are the customers likely to respond to a refinancing or alternative product offer. Other loan products 118 typically include a product called an any purpose loan (APL) which is an unsecured cash loan. For the most part, unsecured cash loans do not allow the customer to consolidate their existing loan.

Early Termination Model

By borrowing money from other financial sources and prepaying and terminating their contracts, such customers create a serious retention challenge for a lender. In one embodiment, an early termination model is utilized to identify prepaying customers (e.g. early terminators) at least three months before they prepay a loan. The model utilizes six months of loan performance, demographic data (customer information) and rules to predict likely loan terminations. In order to retain these customers, a lender attempts to cross sell the borrower new loans at competitive rates. The annual percentage rate (APR) of the new loan may be lower than the APR of their existing loan. Although the amount of profit of a refinanced loan, at a lower APR, may be lower than that of the original loan, the sale of the new loan, more often than not, is preferable to losing the customer to a competing lender.

In the early termination model, calculations of expected income and probability of early termination for the loan are made, using rules which are described below, for each customer, at each stage of the loan. The rules are stored in database 18. Marketing decisions for each individual customer are based on the expected loan income. For example, for customers with either high propensity to early terminate or for customers who have repaid most their interest payments, a new offer is sent out.

In this approach, the remaining income for each customer at each time (e.g. month) is calculated according to the following rule. If the loan period is T months and the customer is at time t, then the interest payments for all the remaining months, t+1, t+2, . . . T are calculated, and stored within database 18.

Probabilities to early terminate for t+1, t+2, . . . , T are also computed. There are various ways of computing the probabilities of early loan termination for each customer. In one embodiment, a series of logistic regression models are used to predict the probabilities. $A_i$ denotes an event, for example, the customer has early terminated at month i, and $A_i^C$ denotes the complement of event $A_i$.

To receive a payment in a given month, the customer has to fail to early terminate in that given month and all previous months. An event that is a customer making a payment in a given month means that the customer has not early terminated for all months up to and including that given month. That is, $$A_1^C \cap A_2^C \cap \ldots \cap A_k^C.$$

By the chain rule formula, $P(A_1^C \cap A_2^C \cap \ldots \cap A_k^C) = P(A_1^C)P(A_2^C|A_1^C) \ldots P(A_k^C|A_1^C \cap A_2^C \cap \ldots A_{k-1}^C)$ and, $P(A_1^C) = 1 - P(A_1)$.

$A_1, A_2, A_3$, denotes events where the customer has early terminated in month 1, 2 and 3 respectively. Note that months 1, 2 and 3 represent the months at each 3-month time interval whose probability, $P^{(3)}$, to early terminate is calculated. Then $P^{(3)}$ simply represents the probability of the event by $P^{(3)} = P(A_1 \cup A_2 \cup A_3)$.

Using probability properties $P(A_1 \cup A_2 \cup A_3) = 1 - P((A_1 \cup A_2 \cup A_3)^C) = 1 - P(A_1^C \cap A_2^C \cap A_3^C) = 1 - P(A_1^C)P(A_2^C|A_1^C)P(A_3^C|A_1^C \cap A_2^C)$ where the events $A_1^C, A_2^C|A_1^C, A_3^C|A_1^C \cap A_2^C$ represent the probabilities that the customer has not early terminated at month 1, has not early terminated at month 2 given that the customer hasn't early terminated at month 1, etc. The probability calculations are made based upon stored customer information, for example, payment histories, within database 18. Using an assumption that monthly attrition probabilities are equal:

$$P^{(3)} = P(A_1 \cup A_2 \cup A_3) = 1 - (1-p)^3 = p^3 - 3p^2 + 3p.$$

Having computed monthly interest payments and probabilities for early termination, an expected income from the customer's existing loan is calculated. Rules for calculating an expected income are stored in database 18. For example, if a loan period is T months and the customer is repaying the loan in monthly installments, $I_1, I_2, I_3, \ldots, I_T$ is the interest income, excluding capital repayment, from the customer per month, discounted to the origin of the loan.

If the customer would stay on book until the end of the loan, (e.g. continue paying interest installments), then the total income would be $$\text{Total Income} = \sum_{i=1}^{T} I_i. \qquad (-1-)$$

However, if there is a probability that the customer will early terminate at some point in time the expected income is calculated. If P denotes a probability to early terminate over the lifetime of the loan, then the expected total income is $E(\text{Income}) = (1-P)*\text{Total Income}$, where Total Income is calculated as above.

At each point in time (i.e. at every month) using the probability of early termination, $P_i$, $i=1,2,\ldots,T$, where T is the loan period, and defined above, the early termination model provides an expected income, given the set of probabilities, as $$E(\text{Income}) = \frac{(1-P_1)I_1 + (1-P_1)(1-P_2)I_2 + \ldots +}{(1-P_1)\ldots(1-P_T)I_T} = \qquad (-3-)$$

$$= \sum_{i=1}^{T} \left[ \prod_{k=1}^{i} (1-P_k) \right] * I_i$$

which is incorporated as a rule within database 18.

At the end of month m, the expected income for the remaining loan period will be $$E(\text{Income}^{(m)}) = \sum_{i=m}^{T} \left[ \prod_{k=1}^{i} (1-P_k) \right] * I_i. \qquad (-4-)$$

Example Calculations

To clarify the above, below are two example calculations of expected income. The first calculation is at the beginning of the loan period and the second is at an arbitrarily chosen $20^{th}$ month.

At the beginning of the loan , (e.g. time=0 and i=1 ) expected total income becomes $$E(\text{Income}) = (1-P_1)I_1 + (1-P_1)(1-P_2)I_2 + \ldots + \prod_{i=1}^{T}(1-P_i)I_T.$$

At month 20, m=21 and expected income is calculated as $$E(\text{Income}) = (1-P_{21})I_{21} + (1-P_{22})(1-P_{21})I_{22} + \ldots + \prod_{i=21}^{T}(1-P_i)I_T.$$

At each particular month, m, the set of probabilities is updated by the modeling algorithm where $P_i^m$ is a probability to early terminate at month i, given update information up month m.

Specifically, $$E(\text{Income}^{(m)}) = \sum_{i=m}^{T} \left[ \prod_{k=1}^{i} (1-P_k^m) \right] * I_i.$$

As described above, monthly interest income calculations $I_i$, $i=1,2,\ldots,T$, where T is the loan period, are used to compute expected income calculations. Cash flows for the business showing a monthly internal rate of return are calculated for each customer using the following rule, which is stored within database 18:

$$\sum_{t=1}^{T} \frac{C_t}{(1+I_{RR})^t} = 0.$$

Knowing the monthly rate of return the monthly installments, M, are decomposed into capital payments, $B_t$, and interest payments, $I_t$, i.e. $M=B_t+I_t$. In one embodiment, M the monthly installments are constant during the lifetime of the agreement. The model is configurable for variable monthly installments as well.

As an illustration, a decomposition for the first two months is given by $I_1=I_{RR}*L \Rightarrow B_1=M-I_1 \Rightarrow L_1=L-B_1$, for month one and $I_2=I_{RR}*L_1 \Rightarrow B_2=M-I_2 \Rightarrow L_2=L-B_2$ for month two, where $L_1$, denotes the remaining capital amount, and L denotes the original loan amount.

Losses are avoided by not targeting all consumers. To facilitate loss avoidance, again using the auto loan as an example, an auto finance income curve, also described as a yield curve, is used to calculate an income a lender can expect to receive from the customers for the remaining months of the auto loan. Yield curves are well known in the art and are extensively utilized in financial and government sector in computing yields for various financial instruments. For example, yield curves on bonds are used to show the yields for different bond maturities and also to show the best values in terms of financial growth. In one embodiment, the early termination model is linked with the yield curve within system 22 to identify which consumers should be solicited for loan cross-sell before they terminate their current loan insuring that the lender does not leave any funds not working for them, while also addressing customer retention.

Generation of Customer Leads for Dealers

In addition to the possibility of refinancing and the offering of other loans to try to prevent early loan terminations, other models for customer life cycle management are embodied as rules to identify appropriate communications and actions to present to a finance customer throughout his/her finance lifecycle. Still other models are used to determine which inactive customers, those without current loans, to target for various products, for example, direct auto loans to consumers to buy a new car, buy insurance (including, but not limited to, payment protection insurance (insurance against becoming unable to make payments because of illness), personal accident insurance, and auto insurance), personal loans, and debt consolidation loans to repay auto loans, credit card debt and other non-lender financed loans.

Figure 4:
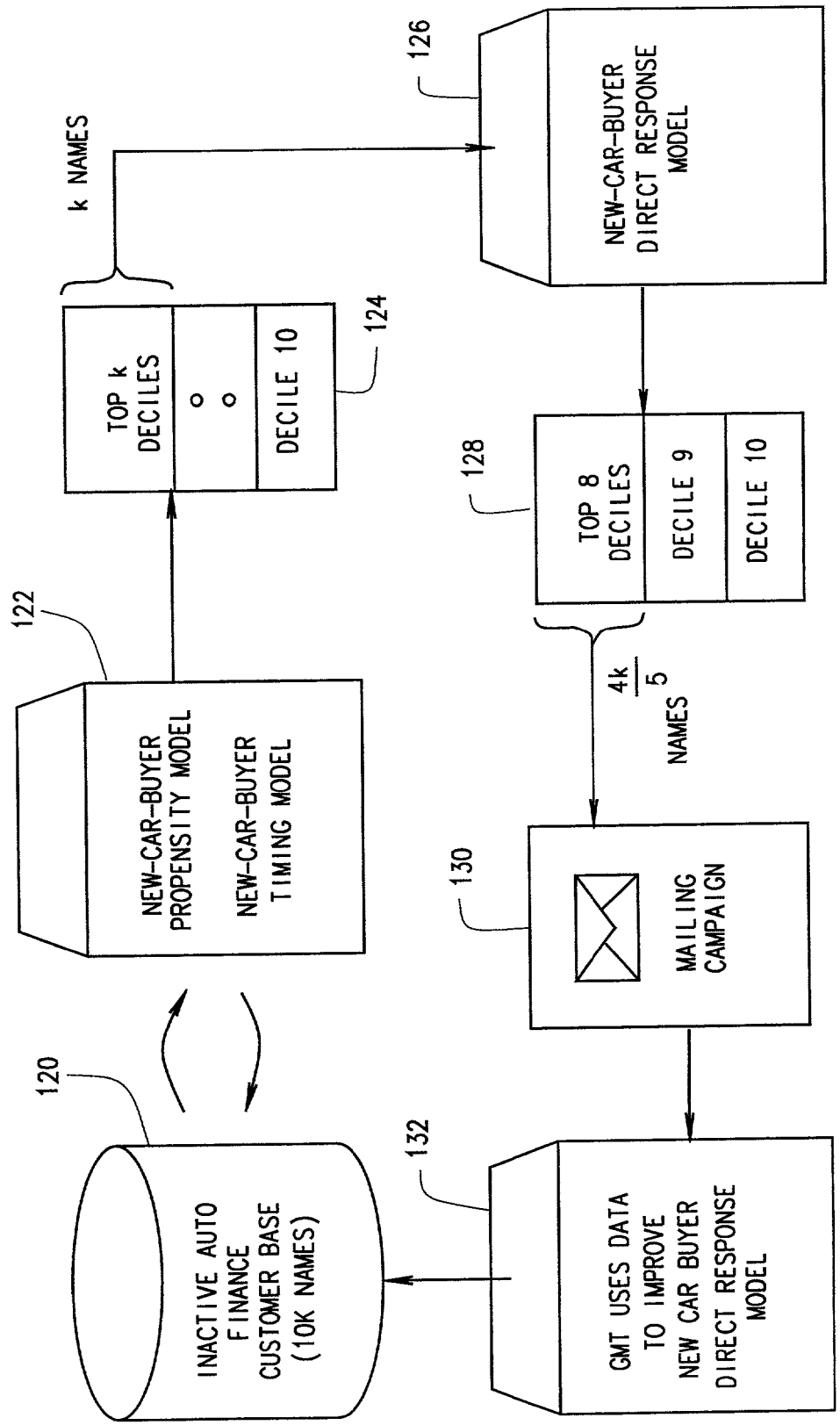
FIG. 4 illustrates a process for identifying potential customers with a propensity to accept an offer.

FIG. 4 illustrates a process for identifying inactive customers who would likely be interested in a new automobile purchase. Such a process is capable of being hosted on a system such as system 22 (shown in FIG. 2). Models are combined and utilized to predict when and which customers will purchase direct loans. An inactive customer database 120 contains records of inactive former customers. It should be noted that database 120 is also described as database 18 (shown in FIG. 1) or database 34 (shown in FIG. 2). The customer data is modeled using propensity and timing models 122 embodied as rules within database 120, to determine a customer group 124 who have a propensity to purchase and when a probable time of purchase for those customers will occur. A subset of group 124, is modeled using a direct response model 126 to increase response and conversion rates and outputs a group 128 likely to respond to a campaign. A campaign 130 targeted to group 128 is initiated and feedback 132 regarding purchases and non-purchases are input into database 120. Such modeling reduces mailing costs by implementing period-specific customer targeting.

Figure 5:
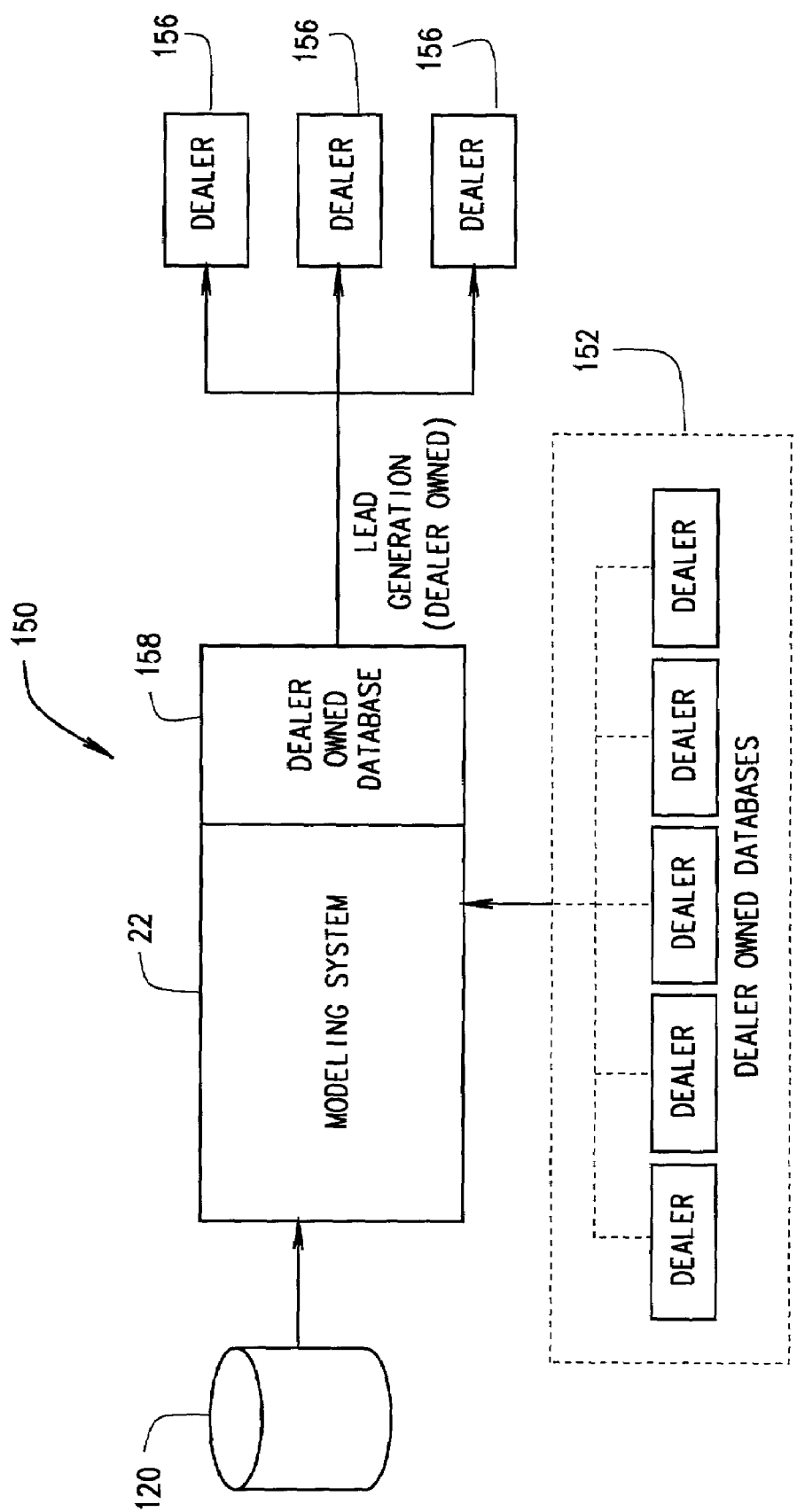
FIG. 5 is a data diagram for a dealer lead system.

Propensity and timing models 122 use customer characteristics, including, but not limited to, age of current auto, earnings, probable loan period, payment history, percent of current auto that was financed, and current installment payments, to predict a buying period and propensity to purchase for each customer. Predictions of timing and propensity are determined within the models based on computed probabilities, as described above in the early termination model. Direct response model 126 supplements propensity and timing model to increase response and conversion rates using characteristics including, but not limited to, earnings, a time amount the customers has had loans, a time amount the customer has been a customer, marital status, and percentage of current auto that was financed, again based upon computed probabilities. The process described in FIG. 5 is further configurable to predict when a customer might purchase a second auto. Other customer characteristics that may be utilized in the model include price of auto, genders, arrears, interest charged, former purchase was a new vehicle, customer age, value of trade in auto, time in employment, credit rating, customer home owner, how long since customer, when last proposal was made and total amount repaid from first loan. Although campaign 130 is described as a mailing campaign, targeted customers can be contacted by one or more of e-mail, fax, cell phone, and telephone. Data gathered in database 120 comes from multiple sources, for example, Internet, legacy data, fax, phone and cell phone.

In another embodiment, customer characteristics are clustered, using rules stored within database 120, to segment consumers and identify sales opportunities within active and inactive customers. Examples of clustered customer groups, for example, would include young used-car buyers, bargain hunters, families, high spenders and reluctant borrowers. Clustering is based upon groupings of customer characteristics, the characteristics being the customer demographics utilized as model inputs, listed above.

As described above, customer information and model predictions regarding customer purchases are stored in database 120 and are accessible interactively at any time via the internet. The above system and modeling descriptions provide suggested triggers which activate a cross-sell process for an account, generate leads for increased sales, and predict which customers are likely to terminate early or respond to a further marketing campaign.

In one embodiment, the process shown in FIG. 5 is utilized to generate leads to supply to dealers for the sale of new products. As described above, system 10 uses modeling as described herein to identify customers from both active as well as inactive files who are likely to respond to an offer and make purchase a product. Since, in one embodiment, system 10 is web-based, dealers or other industries are given access to system, for example, via the internet, to access customer leads. Customers that have been contacted may also access the Internet to view offers instead of visiting the dealership.

FIG. 5 is a data diagram 150 for such a dealer lead system. In one embodiment, dealer owned databases 152 of customer data are combined with the customer data in database 120, which is lender owned (shown in FIG. 4) and modeled using system 22 according to the process described in FIG. 4. By combining data within dealer owned databases 152 and data within database 120, dealer specific customer contact lists are generated, using models such as those described above, which are transmitted to dealers 156 and are stored in a dealer customer database 158. System 22 (shown in FIG. 2) is configured to prevent databases 152 owned by one dealer from being co-mingled with another dealer's database 152.

Figure 6:
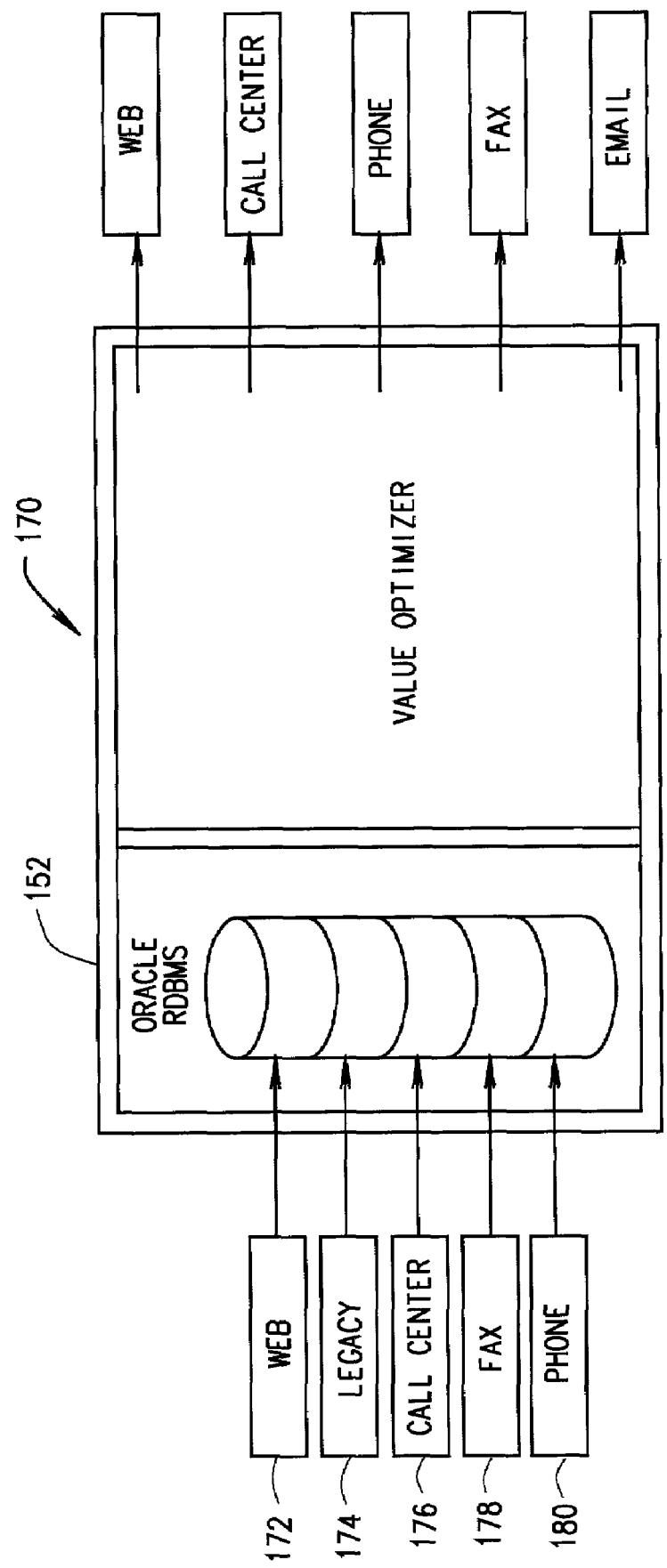
FIG. 6 is a data structure indicating sources of data in a database.

FIG. 6 is a data structure 170 indicating sources of data to be stored within a dealer database 152 (shown in FIG. 5) including, but not limited to, web 172 (or Internet), legacy data 174 from previous sales, call center 176 where prospective customers call a dealer and in turn, the dealer receives customer data, fax 178 and phone 180 are other sources where a dealer can store data within database 152. By modeling with detailed customer data, as described above, including clustering of customer groups as described above, dealers provide better service to potential customers by identifying specific needs for each potential customer. Customer data updates uploaded to database 120 (shown in FIG. 4) can cause an automatic update to modeling outputs, since system 22 (shown in FIG. 2) is web based and can be configured to provide such automatic updates.

Auctioning of Customer Leads to Dealers

As described above, the modeling methods described herein pro-actively seek prospective borrowers from the wider population and can therefore identify prospective customers with a propensity to buy, and further identify the timing of such customer purchases. As also described above, dealers with such customer information would typically market to these prospective customers to invite them to buy their products and take a loan through the dealer from the lender that has provided the modeled prospective customer list. Since the modeled prospective customer list is valuable to dealers wishing to make sales, dealers will pay a lender who provides a list of high probability prospective customers.

Figure 7:
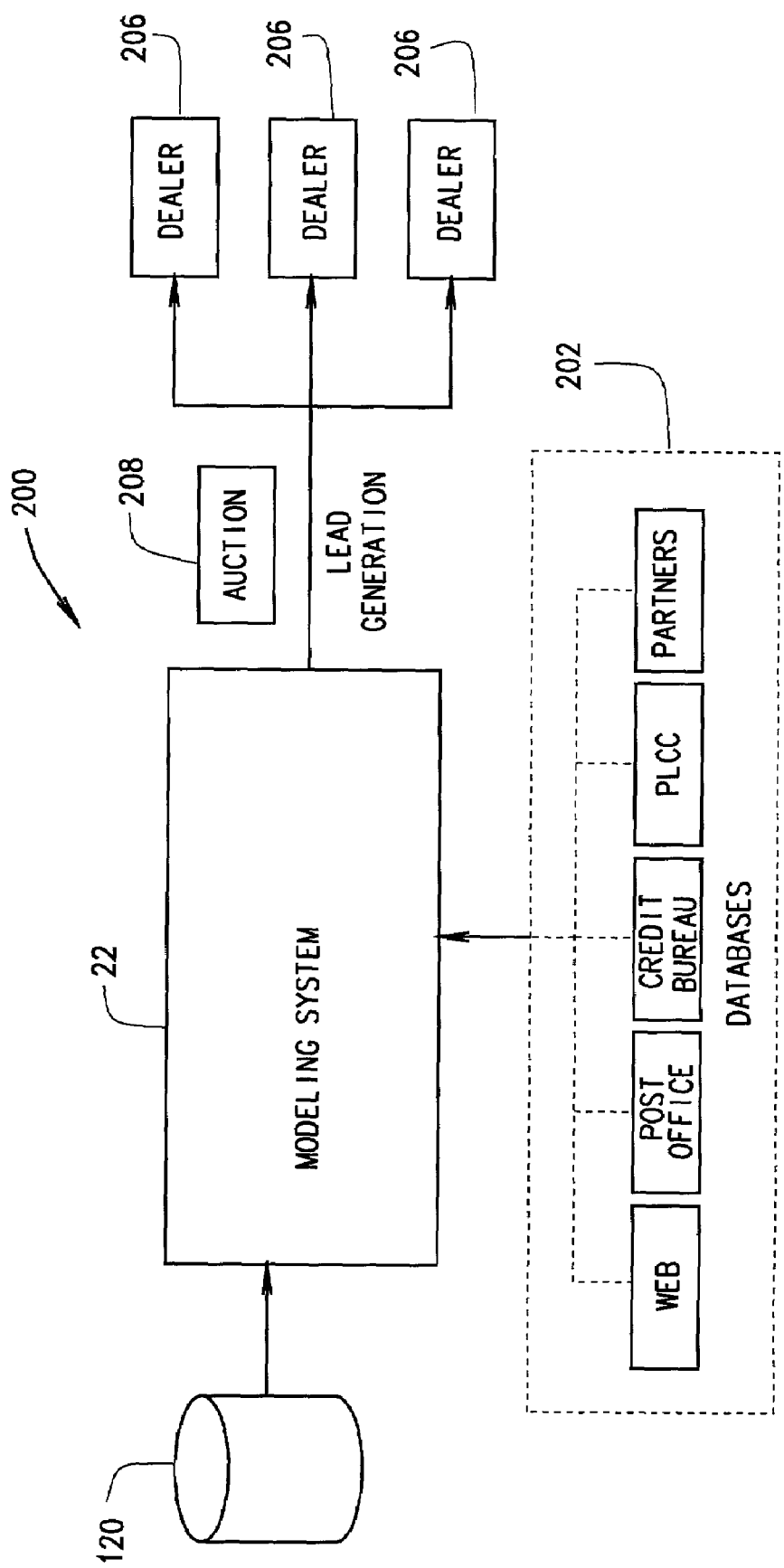
FIG. 7 is a data diagram of a prospect pool auction.

FIG. 7 is a data diagram 200 diagramming a prospect pool auction being conducted by a lender. Lender owned databases 202 with data sources as described above and others are entered into system 22 which incorporates the modeling processes described above. Dealers 206 bid for the pools of prospects for purchase of their products, via an auctioning 208 process. System 22 (shown in detail in FIG. 2) is configured to conduct the auction process and, as described above, generate customer lists for auctioning via modeling and clustering processes. System 22 includes rules to calculate for each customer a probability that a customer will respond and make a purchase decision once a product offer is made to that customer based on the modeling process. The auction is a probabilistic auctioning. Participants in the auction have access to depersonalized information (no names and addresses) available on the customers as well as the probability of response to an offer (i.e., car loan, personal loan). Dealer 206 participants can bid on each customer one by one or they can bid on a group of customers who belong to a particular cluster. Dealer participants have capability to set a range of probability of response, for example, 90 percent and higher, they are interested in and bid on prospective customers who fall within that range. Bids, customer probabilities, and clustered customer groups are stored in database 120, as are rules for matching the bids with the probabilities and the customer groupings.

The auction described herein is different from a typical auction where the owner of an asset offers the asset for auctioning. The auction described is also different from the reverse auction, which is sometimes called a demand driven auction, where bidders who express their willingness to pay a set amount of dollars for a given service and then offers that amount to suppliers of those services who are willing to meet the price offered by consumers. In essence, demand is driving the auction. The auction described herein is based on an early identification of the needs of customers for a particular product before customers express those needs or demands. Customers' needs are identified by modeling customer data within database 120 (shown in FIG. 4), and the dealer and lender do not have to wait for potential customers to express their demand for services. The lender auctions pre-selected customer lists to businesses (i.e., dealers) who in turn lets the lender finance the purchase of the products for the customers.

Although applicable to any type of loan sale, the examples and models described herein use auto loans only as an example, the scope of modeling applications herein described should not be construed to be so limited.

Customer Relationship Management

The modeling and identification of customers who have a probability of early loan termination or a propensity to accept a financing offer have thus far been described, including identification of high probability new customers in the form of lists for access and auction. However, all of the customer list generation has been described in terms of the sale of loan products to these customers. Such modeling and identification techniques are applicable to retailers of products, for example, department stores, where capturing store account financing is one goal of a lender. Retailers are engaged in dynamically competitive businesses, for the most part, and are faced with reducing margins due to competition. Such retailers also have a need for proactive, agile marketing.

Therefore modeling solutions are applicable for targeting of retail customers, providing such modeling solutions are able to deliver specific, targeted customer relationship management solutions. Such solutions enable retailers to increase customer expenditures and enhance loyalty using data driven decisions from the models to target the right communications at the right times to the right customers.

In addition to timing, propensity and direct response modeling as described above, a retail customer relationship management solution includes a hit and run model and a dormancy model. Hit and run customers do not use their store accounts after an introductory purchase or period. One example is where a discount is offered for a first purchase, provided that purchase is done on a store account. Persuading a number of such customers to make another purchase on the store account is, of course, profitable for the store and for the lender who services the store accounts.

A hit and run model includes application variables, transaction variables and geo-demographic variables. Application variables include, but are not limited to, gender, zip code, date of birth, date store account opened, payment methods, card protection information, availability of telephone, and holder of additional store account. Transaction variables include merchandise groups of first and last purchases, division of first and last purchases, total value of all transactions, value spent on first and last days, total number of transactions average transaction value, average daily transaction value number of different divisions, number of different transaction days, largest and smallest daily transaction values. Geo-demographic variables include zip code data, branch data (which stores purchases were made), and distance data from the customer's home to their preferred branch.

The hit and run model is configured to predict a propensity to hit and run using account data from a first week of an accounts existence. Propensity to hit and run may also be determined based on particular transaction variables. The hit and run model and the dormancy model, described below, use customer demographics and account and spending data for determining a probability of hitting and running or dormancy, respectively, similar to the process described above for the early termination model.

A dormancy model is similar to the hit and run model, the difference in definition being that there were no introductory purchases made. Transaction variables in a dormancy model include, but are not limited to, gender, town, customer age, account age, number of purchases in 12 months, value of purchases over 12 months, number of total purchases, value of total purchases, value of transaction, card style, division, style, number of total purchases/account age, value of total purchases/account age, and value of total purchases/number of total purchases.

Customer relationship management solutions are based on key performance indicators, such as the variables described above, and an optimization of spending patterns along retail dimensions through actionable analysis. Solutions include access to embedded clustering analytics provided by models, which are embodied as rules in database 18, for example, to further profile cluster groups, for example, young low spenders, shopaholics and high-frequency shoppers, against key performance indicators, for example, amount spent and transaction frequencies. Such an application of modeling rules provides ad-hoc views of data to be reconstructed and allows profiling of cluster groups against a listing of attributes, for example, age, gender and geographic area.

In one embodiment, the models are embodied as rules within database 18 to predict future spending of each customer in a database in a specified time period. In another embodiment, models are configured to rank order customer accounts that have not had spending activity in a given number of days, to predict a likelihood of spending in the next given number of days. Weeks and months are time frames which are also implemented in the models. In still another embodiment, models are embodied as rules to rank order customer accounts that have had spending activity only once, based on a probability of there ever being any future activity within the account.

The models are used with planned promotional events, configured to determine an optimal mailing list and a size of the mailing, based on a likelihood of response, an overall response rate and profitability margin. Using such models, product purchase patterns are identifiable and key variables which will indicate trends are also predictable. Once a retailer or system user has entered available information into databases, a one-click marketing solution to a campaign is available based on model output. Customer relationships to be managed, include, for example, store credit cards, bank cards, financing of sales, and customer loyalty. Those customer relationships are channeled through multiple retail mediums including point of sale, home shopping, E-commerce and Digital television.

Figure 8:
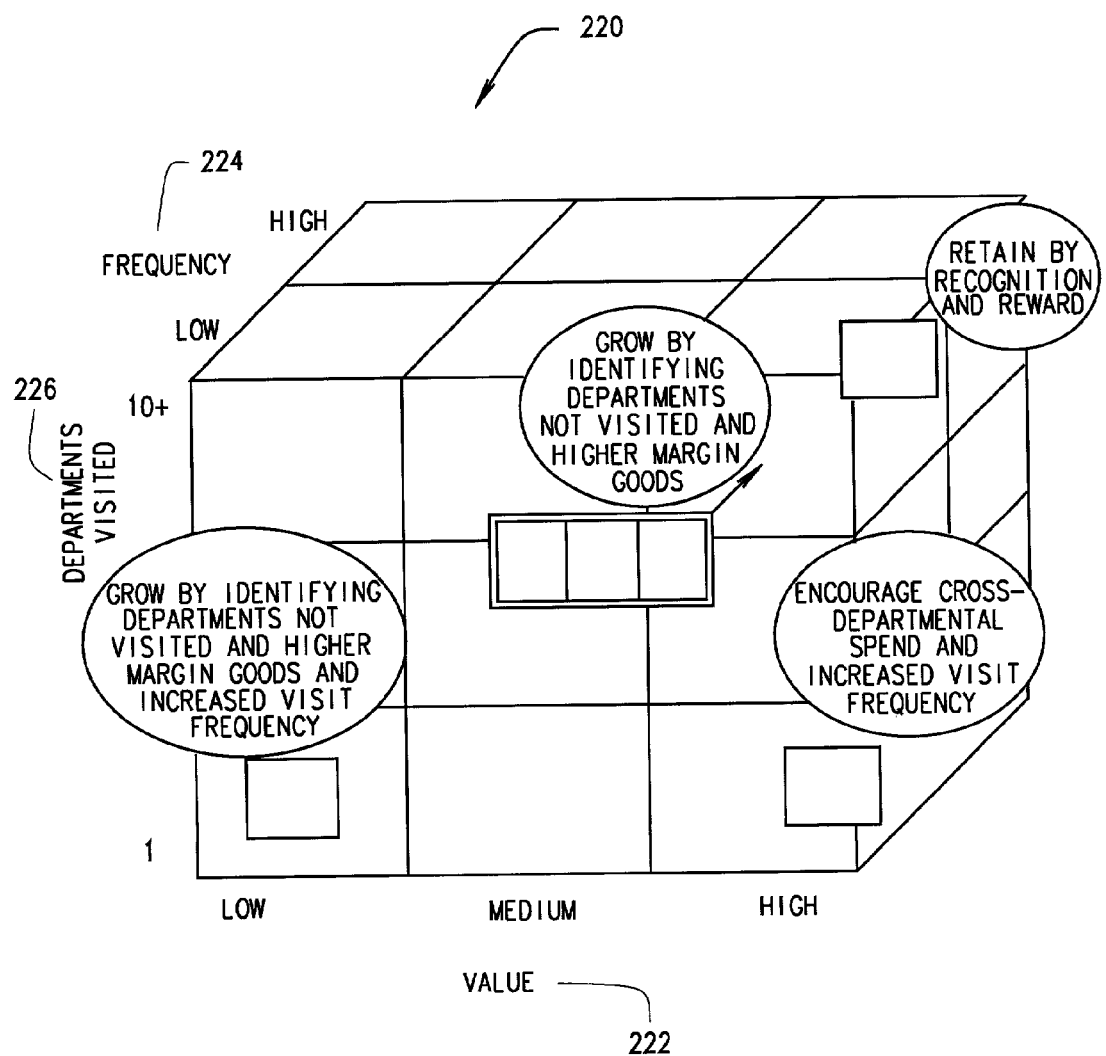
FIG. 8 is a multi-dimensional diagram depicting management of a customer relationship.

FIG. 8 is a multi-dimensional diagram 220 depicting management of a customer relationship. Although the example in FIG. 8 is exemplary, the example is not exhaustive. Diagram 220 is three dimensional, depicting retail relationships with customers based on value 222, frequency 224, and departments previously visited 226. The customer relationship is further managed by identifying departments not typically visited, for example, by segmentation. Such segmentation is used to prepare marketing solutions which expose the customer to those non-visited departments in an attempt to increase sales frequency and visits to those departments.

Figure 9:
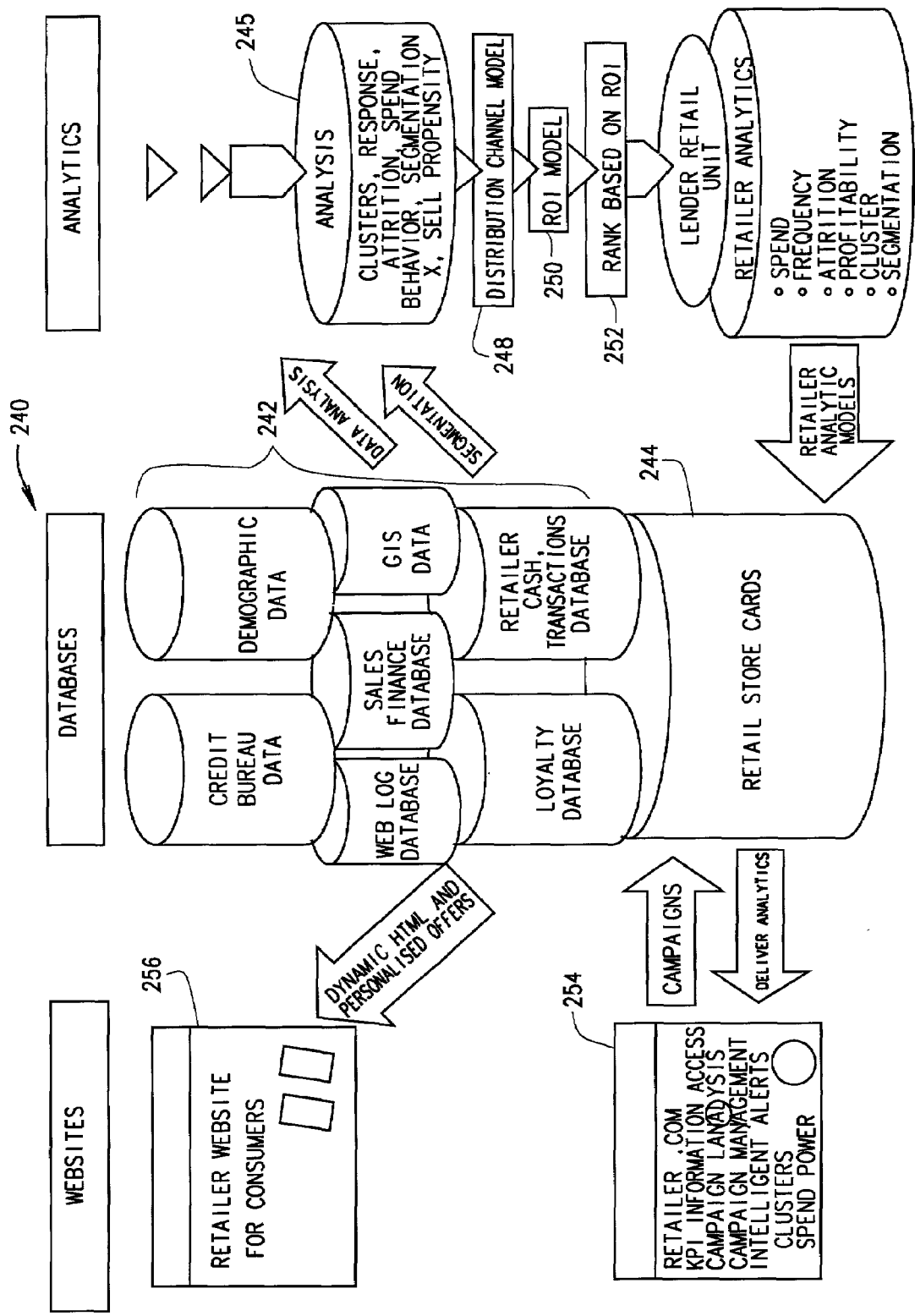
FIG. 9 is a data diagram depicting data flows in a customer relationship management system.

FIG. 9 is a data diagram 240 depicting data flows in an exemplary customer relationship management system. Data diagram 240 includes a number of databases 242 which are populated with customer retail store card data 244 and the model variables as listed above. Data, stored in databases 242 are subjected to modeling analysis 245 for dormancy, hitting and running, clustering, attrition, spending behavior, response probability, and cross-selling propensity, and further subjected to, in the embodiment shown, a distribution model 248 and return on investment model 250. The customer data is then ranked 252, based on the return on investment model 250, and made available to retailers as retail store card data 244. In one embodiment, the dormancy and hit and run models are implemented using a system, for example, a system such as system 22 (shown in FIG. 2) enabling retailers access websites 254 to view model outputs and therefore construct customer campaigns, for example, websites 256 with personalized offers for targeted customers.

Application of historical data allows the building of models to attempt to capitalize on the future demand of customers. The hit and run and dormancy models described above are configurable to take into account seasonality, socio-economic trends, information on past levels of demand, and other factors enabling dealers to optimize their capacity by predicting those accounts holders who will go dormant.

Screen Shots

Figure 10:
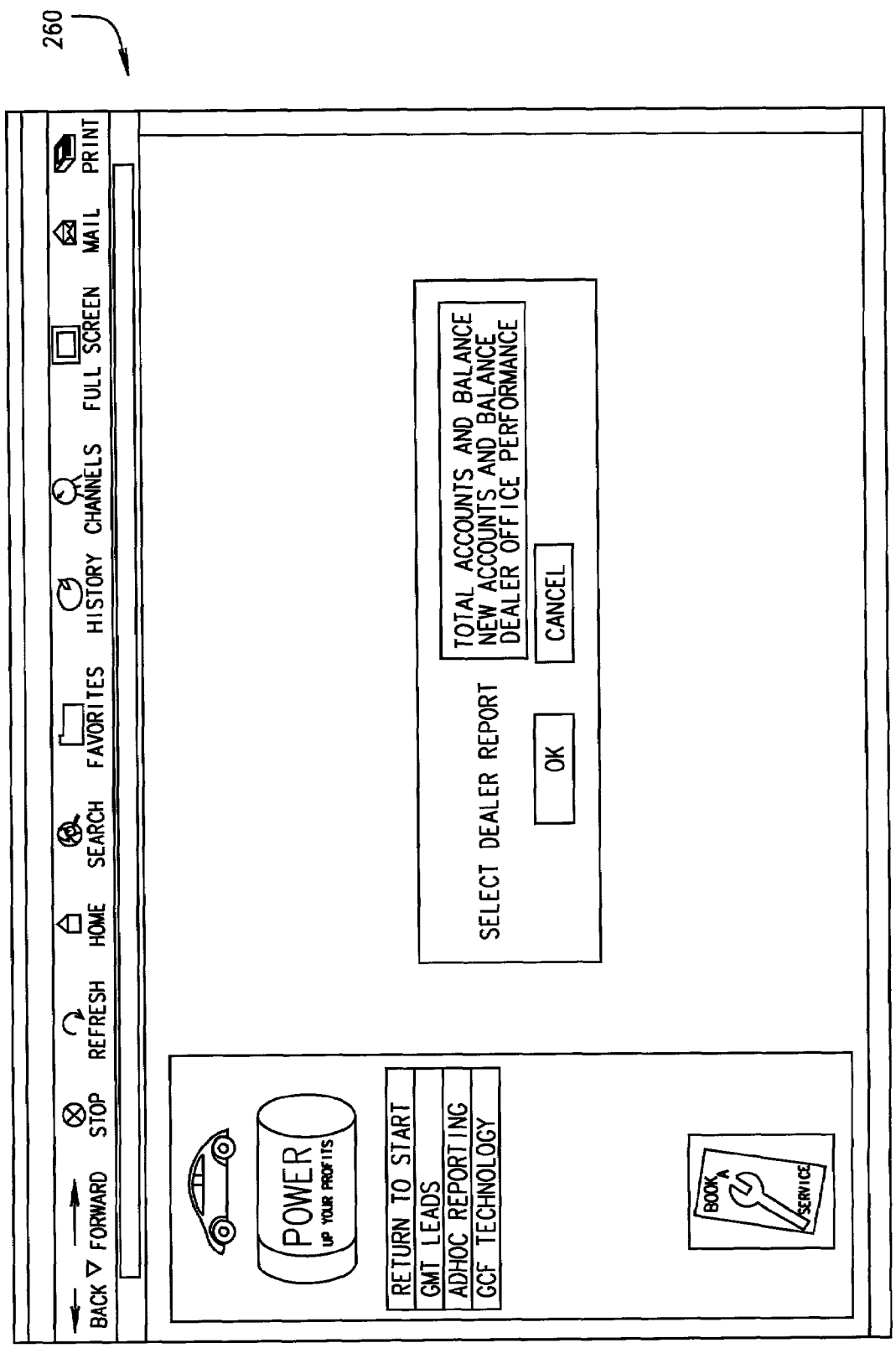
FIG. 10 is a user screen used for selecting a listing of accounts.

FIG. 10 is a user screen 260 displayed by system 10 or system 22 which is used for selecting a listing of accounts. Screen 260 is configured for selecting customer groupings for identification of early terminating accounts, identifying customers with a propensity to take out a loan for purchase, or to manage customers with retail accounts. As shown in screen 260, a user can select a listing of total accounts and balances, new accounts and balances and a report showing dealer office performance. It is contemplated that screen 260 also include a selection for inactive accounts.

Figure 11:
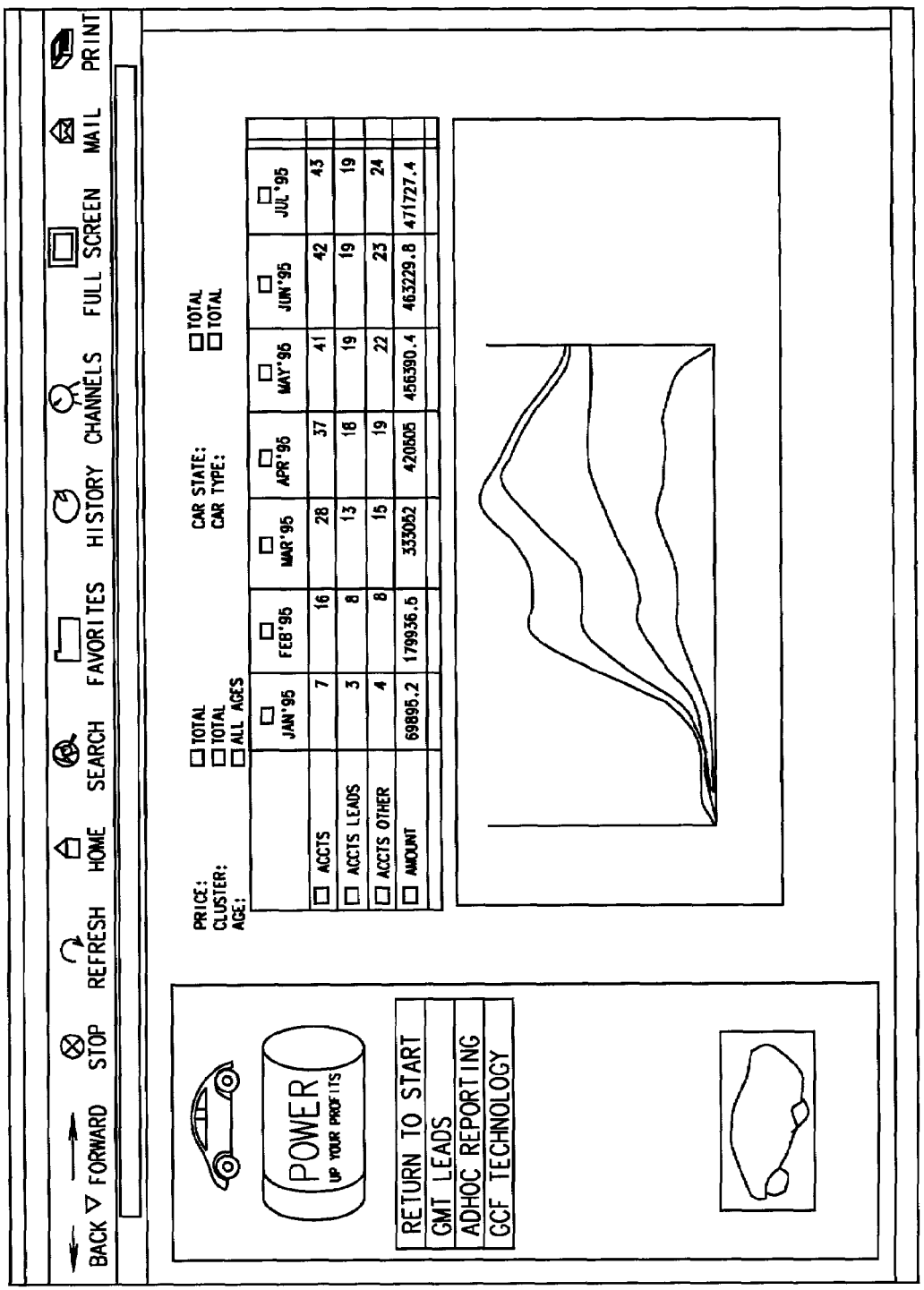
FIG. 11 is a user screen listing customer accounts and account leads for a number of months.

FIG. 11 is a user screen 262 displayed by system 10 or system 22 listing customer accounts and account leads for a number of months. Through screen 262 a user is able to track a number of accounts that have resulted in leads for customer retention, as described by the early termination model, or that have resulted in a customer contact with a dealer regarding possible purchases, resulting in new or additional loan activity for a lender.

Figure 12:
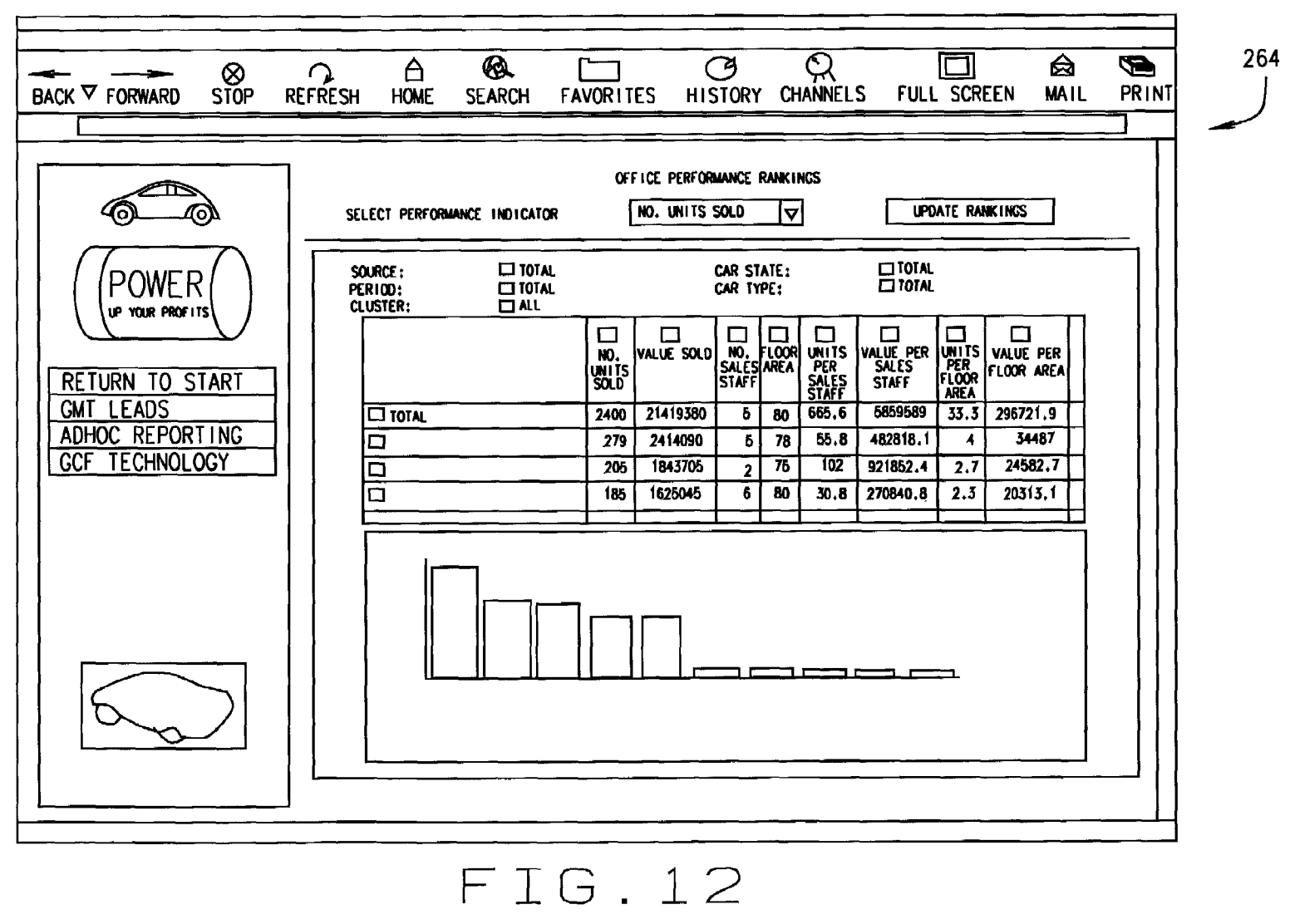

FIG. 12 is a user screen 264 displayed by system 10 or system 22 showing account generation by dealer office. As shown in screen 264, dealers are ranked according to performance indicators. Such performance indicators include value of units sold or refinanced and number of units sold or refinanced. The reports can be generated for user selectable time periods (e.g. year, month).

Figure 13:
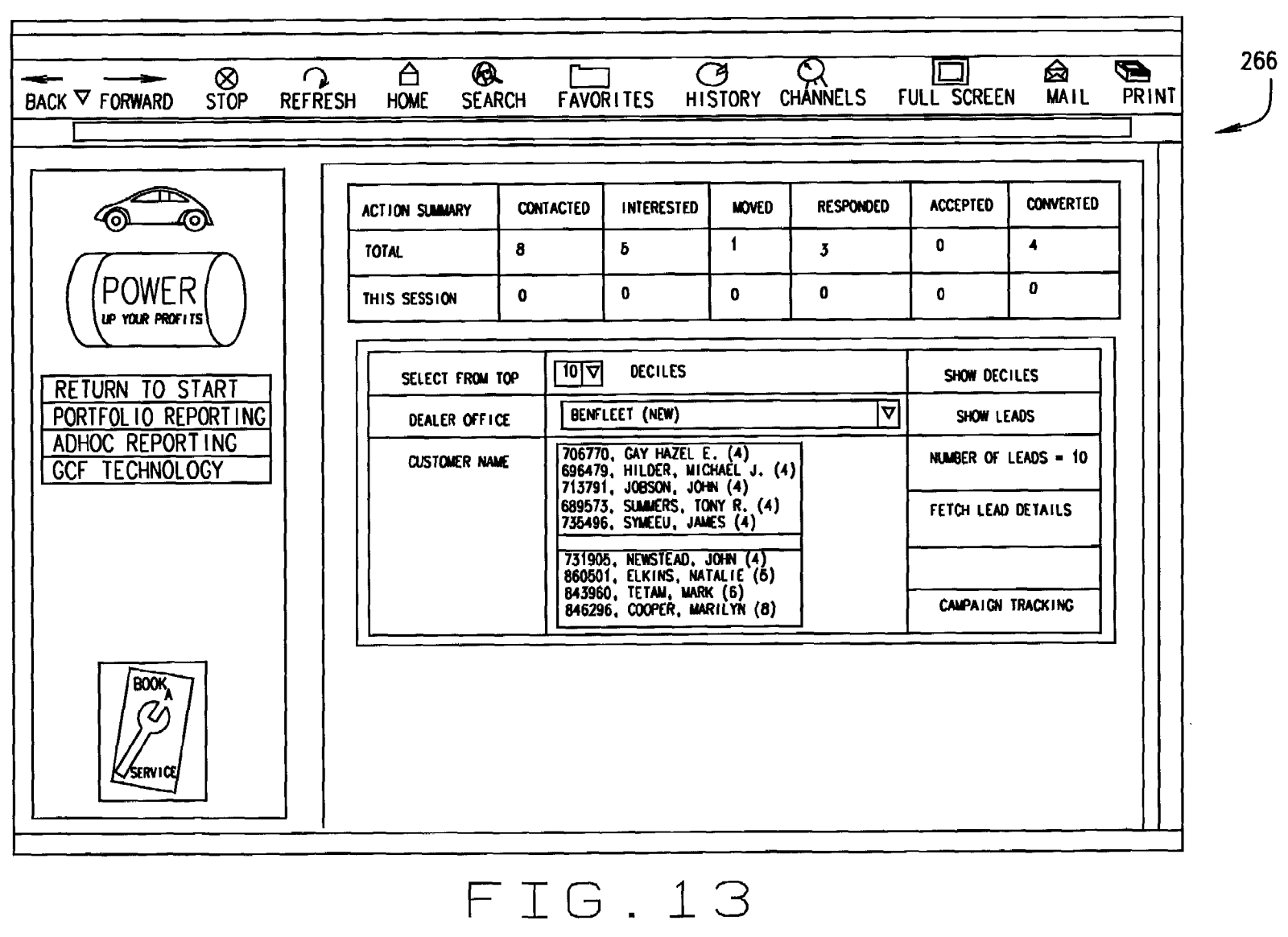

FIG. 13 is a user screen 266 displayed by system 10 or system 22 showing a modeling output of customer prospects. Screen 266 is used in both customer retention programs (e.g. identification of early terminating customers) and potential or repeat customer identification. As shown in screen 266, for a number of customers contacted, there is a number of those customers which are interested, moved, responded, accepted or converted to a new finance opportunity. Interested customers are ranked according to probabilities to refinance (or purchase new products). Listed customers are selectable for a display of detailed customer information (shown in FIG. 14).

Figure 14:
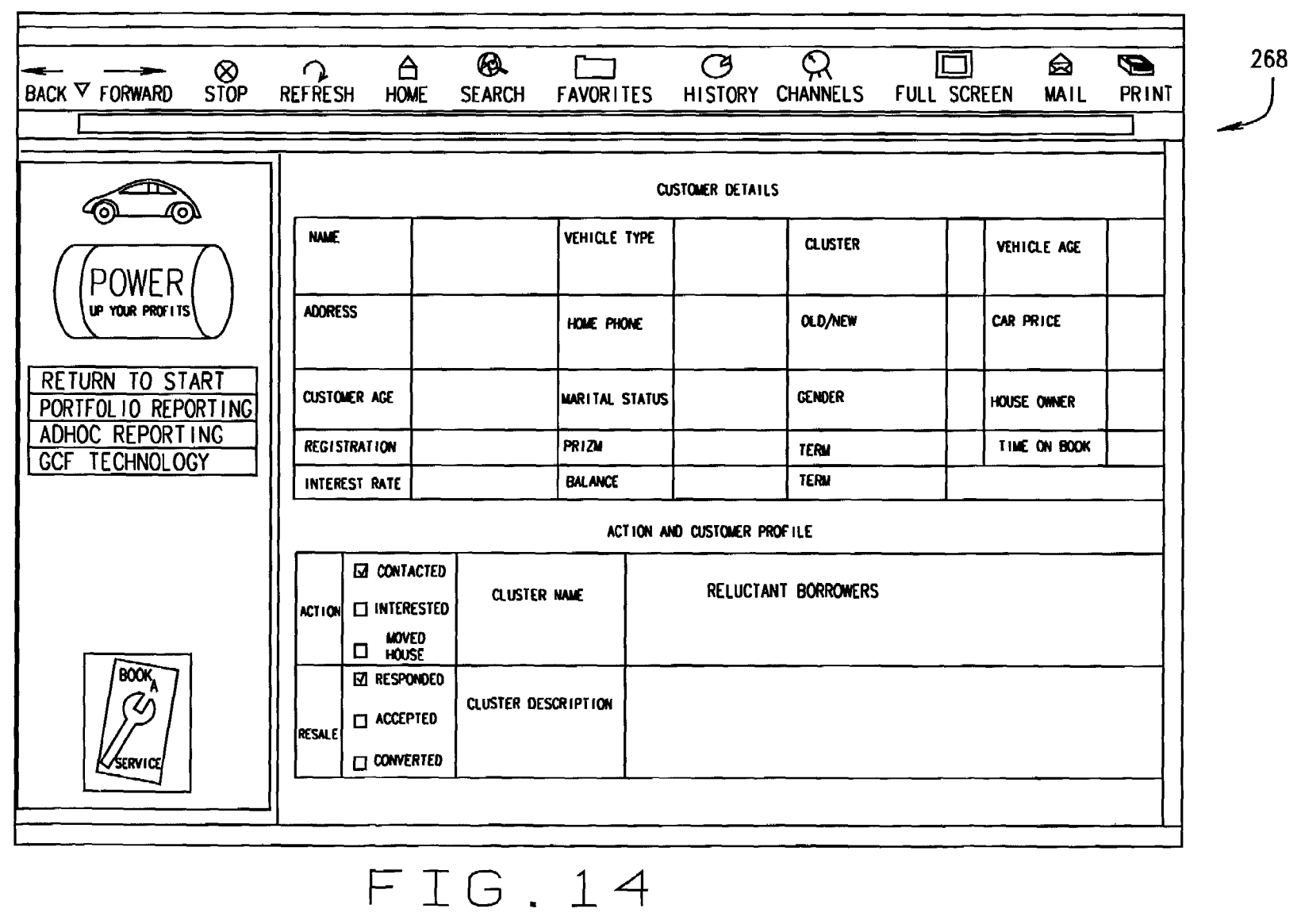

FIG. 14 is a user screen 268 displayed by system 10 or system 22 showing detailed information for one customer prospect, the prospect being selected from screen 266 (shown in FIG. 13). In screen 268 customer information includes name, address, age, interest rate of active loans, balance of loans, marital status, age, gender, if homeowner, vehicle age and vehicle price. Further fields indicate what cluster the customer is in, including a description of the cluster, for example, reluctant borrowers. Further included in screen 268 are fields indicating if the customer has been contacted, if the customer is interested, and what the result of the contact is: accepted, responded or converted.

Figure 15:
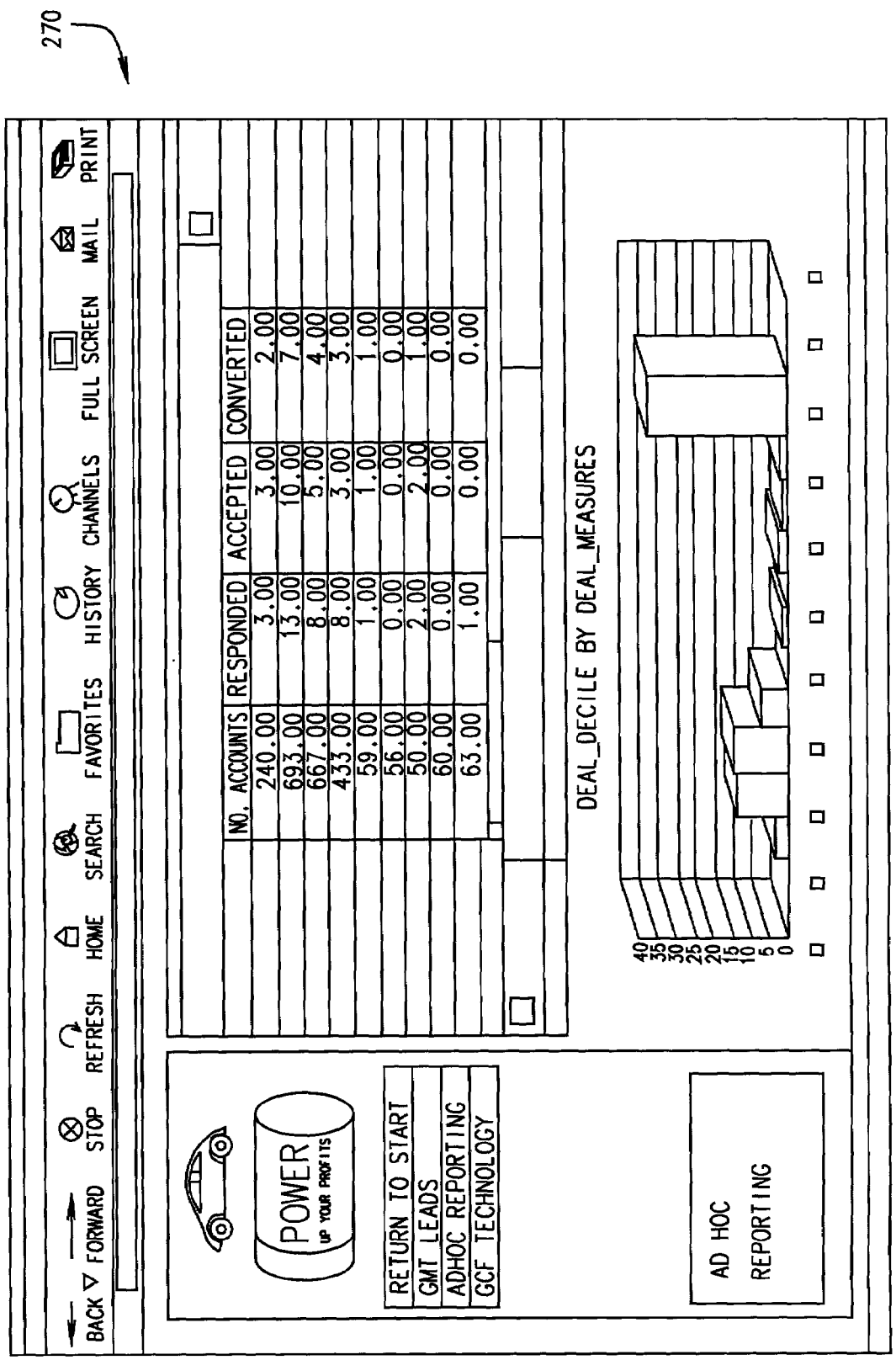
FIG. 15 is a user screen showing results of an offering to potential customers.

FIG. 15 is a user screen 270 displayed by system 10 or system 22 showing results of offerings to potential customers. Screen 270 indicates, by cluster, a number of accounts, a number responded, a number accepted and a number converted. Screen 270 further includes a graph indicating deal measurements, for example, acceptance, by clustered customer groups.

Figure 16:
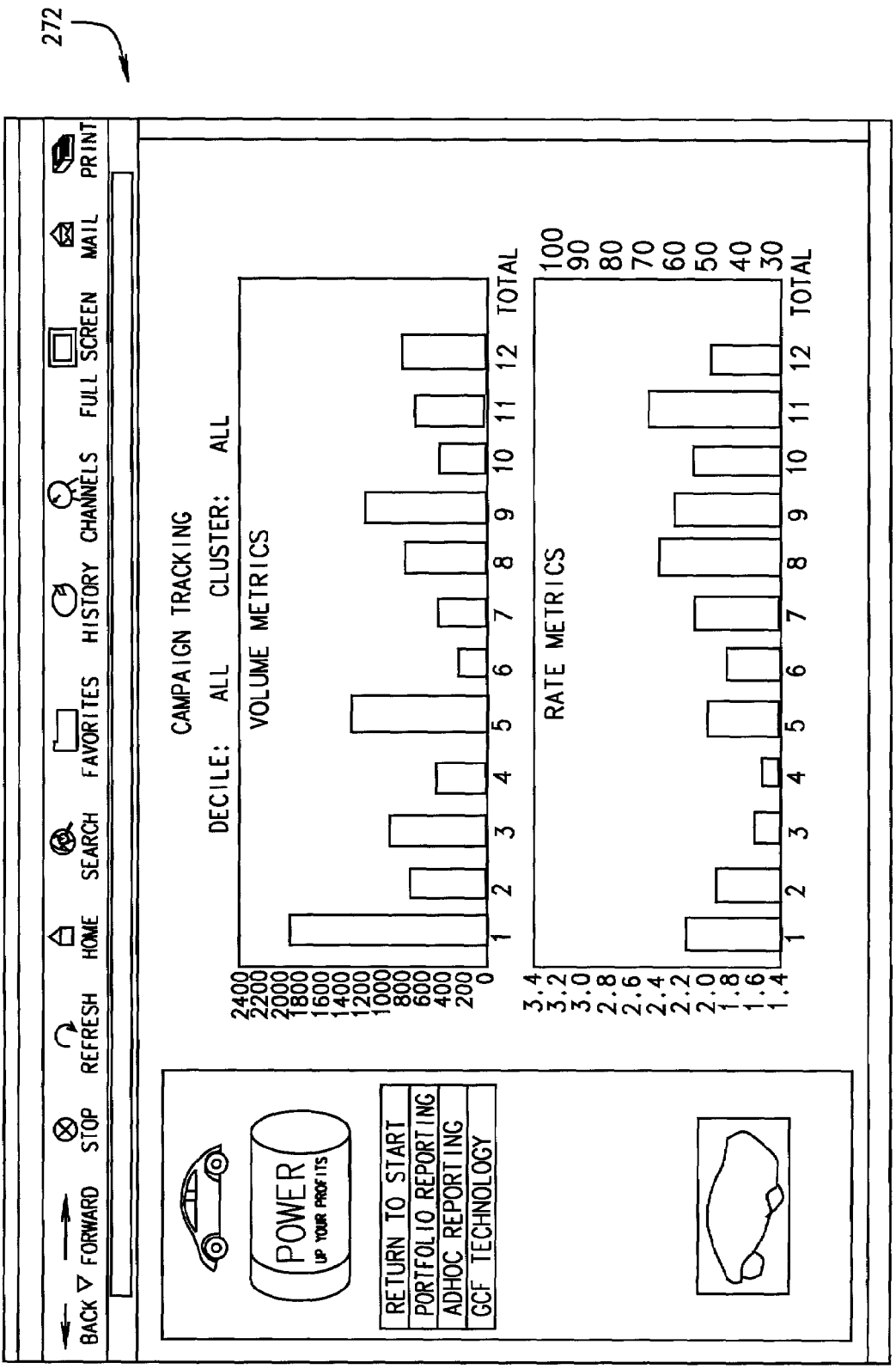
FIG. 16 is a user screen tracking results of offers presented to potential customers.

FIG. 16 is a user screen 272 displayed by system 10 or system 22 tracking results of offers presented to potential customers by volume. As shown on screen 272 volume metrics indicate a number of accounts that have responded, accepted, and converted by week. Rate metrics indicate a response rate, net conversion rate and an acceptance rate by week.

Model Accuracy

Figure 17:
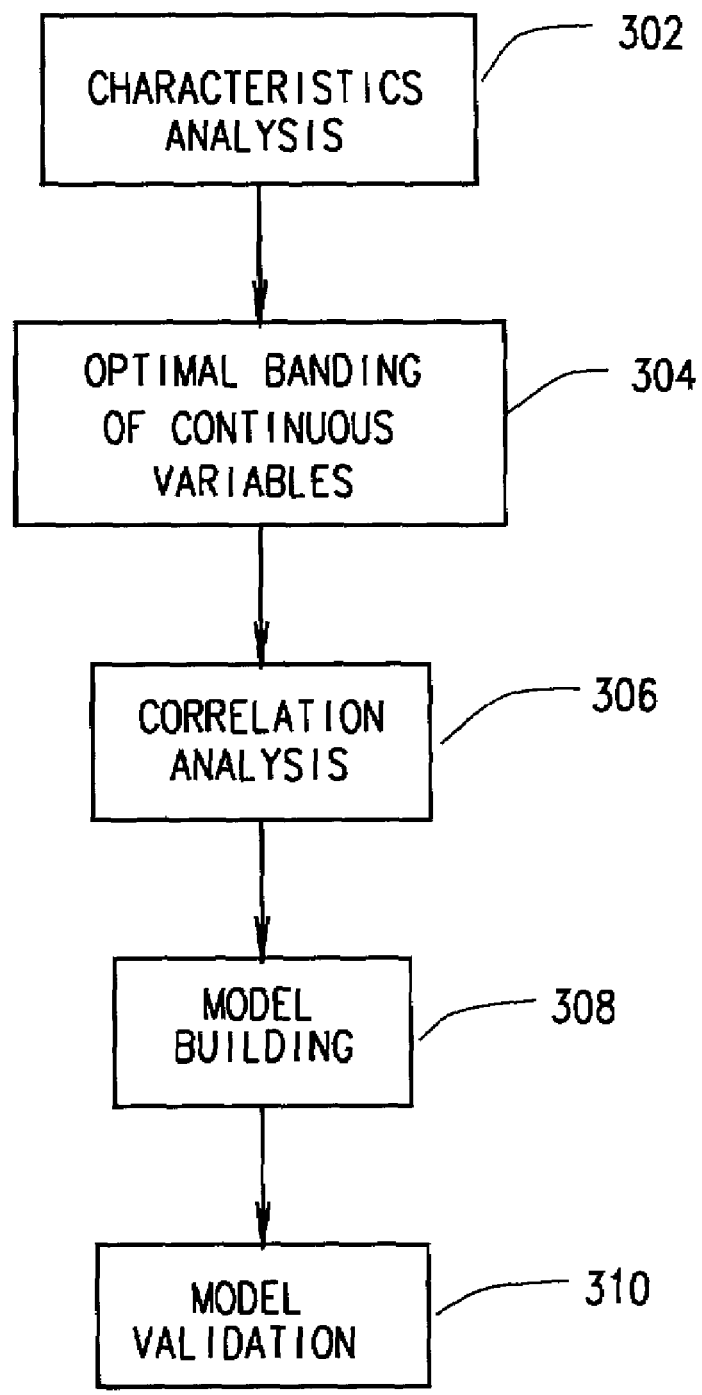
FIG. 17 is a flowchart depicting a model performance measurement process.

FIG. 17 is a flowchart depicting a model performance process 300. In a characteristics analysis 302, each predictive characteristic calculated from observation data is reviewed to success of the characteristic in predicting risks. In a optimal banding process 304, an entropy measure is utilized to optimally split continuous variables into different bands. A correlation analysis is used 306 to identify highly correlated variables, such as those used in the models described above. Where a degree of correlation is not acceptable, the variable pairs are considered for exclusion and analysis by testing each of the two variables in turn for correlation with the outcome variable. The explanatory variable with the highest correlation with the outcome variable is retained for model development, and the other explanatory variable is excluded.

Logistic regression models are built 308 for each time period and the accuracy of the models is then tested with the validation set, for each time period. The models are validated 310 using a set of Lorenz curves, not shown, as a measure of the predictive power of the models. Logistic regression is a form of statistical modeling that is often appropriate for dichotomous outcomes, for example good and bad. Logistic regression describes the relationship between dichotomous variable and a set of explanatory variables. A logistic model for an $i^{th}$ experimental unit is defined as:

$$\prod_i = F\left(\beta_0 + \sum_{j=1}^{J} \beta_j z_{ji}\right) = \frac{\exp\left(\beta_0 + \sum_{j=1}^{J} \beta_j z_{ji}\right)}{1 + \exp\left(\beta_0 + \sum_{j=1}^{J} \beta_j z_{ji}\right)}$$

where $$F\left(\beta_0 + \sum_{j=1}^{J} \beta_j z_{ji}\right)$$

is a cumulative density function for the logistic distribution, and can also be expressed as a linear function of parameters:

$$\ln\left(\frac{\prod_i}{1 - \prod_i}\right) = \beta_0 + \sum_{j=1}^{J} \beta_j z_{ij}.$$

The expected value and variance of the logistic regression model are 0 and $$\frac{\Pi^2}{3},$$

respectively. One of the advantages of statistical modeling is that measures of association are functions of parameters. An association is said to exist between two variables if the behavior of one variable is different, depending on the level of the second variable. In one embodiment, associations are evaluated within a matrix using a statistical measure called concordance. Measures of association are based on the classification of all possible pairs of subjects as concordant pairs. If a pair is concordant, then the subject ranking higher on the row variable also ranks higher on the column variable.

$$C = \sum_{i=1}^{I} \sum_{j=1}^{J} X_{ij}\left[\sum_{k>i}\sum_{l>j} X_{kl} + \sum_{k<i}\sum_{l<j} X_{kl}\right]$$

where $X_{ij}$ stands for the number of observations for $i^{th}$ row and $j^{th}$ column.

Similarly, if a pair is disconcordant, then the subject ranking is higher on the row variable and lower on the column variable.

$$D = \sum_{i=1}^{I} \sum_{j=1}^{J} X_{ij}\left[\sum_{k>i}\sum_{l<j} X_{kl} + \sum_{k<i}\sum_{l>j} X_{kl}\right]$$

Also, the pair can be tied on the row and column variable.

$$T = \sum_{i=1}^{I} X_{ii}\left[\sum_{k \neq i} X_{kk}\right]$$

The higher the concordance, the larger the separation of scores between good and bad accounts. The concordance ratio is a non-negative number, which theoretically may lie between 0 and 1. However, in practice most scores are between 0.6 to 0.95. To ensure that the parameter estimates $\beta_k$ in the logistic regression model have comparable magnitudes for the different independent variables $x_k$, which have different units (i.e. age, deposit, value of the car, interest rate, etc) all the continuous variables have been standardized, i.e.

$$\tilde{X} = \frac{X - E(X)}{\sigma(X)}$$

where $E(X)$ is the mean of $X$ and $\sigma(X)$ is the standard deviation of $X$. Therefore by looking at parameter estimates of the models, magnitudes of different independent variables are compared.

Information collected on customers for modeling input is also used to service more than the financial industry. For example, in a travel industry application, information on the use and servicing of the car is used to predict when long trips will be made, presenting opportunities to cross-sell products relating to the travel industry (e.g. travel insurance, foreign currency).

In addition, some customers will want to take advantage of an offer for a product upgrade or replacement. For example, in the auto industry, many auto dealerships offer schemes whereby they will upgrade a customer's vehicle at some point in the future, taking the original vehicle as a part of the exchange. The models described herein make it possible to estimate the residual value of the original vehicle as a function of time, and therefore predict the residual value of the vehicle at the time that it is accepted as a trade-in, knowledge useful to both customers and dealers.

Modeling allows dealers to optimize their portfolio by taking into account particular risks that the dealers may wish to minimize (e.g. a change in the delinquency rate). Modeling finds the correct decision-making process to make with regard to each individual customer, with respect to the type of loan they should be offered, so as to achieve a portfolio which maximizes profit subject to customer-defined risk constraints.

The models are further used to examine the profitability of an individual client at present and into the future. By taking into account loans in the loan portfolio, expected delinquency of accounts, expected early termination, changes in interest rates, etc, to give a complete picture of the revenues and costs of the client. Such a process allows application of individual processes (e.g. cross-selling a personal loan to a customer. The combination of the processes build a portfolio that a dealer may apply selectively to the customer base over the lifetime of the loan.

In addition, web-enabling of the processes described herein is contemplated so that dealer are able to use models over the internet to model or analyze the customer base in their own way, and will have an instant, interactive tool, to indicate which processes should be applied to which customers. Further, development of applications via wireless application protocols (WAP) so that dealers are able to access and apply analyses from the models without the requirement of access to a telephone line or other medium is foreseen. Traditional marketing techniques as postal mailings, couriers as well as Electronic mail targeting are enhanced by targeting the right customers using the modeling outputs.

Modeling processes occur at certain points in the customer lifecycle. Using these processes a mechanism is enabled by which different processes are applied to the customer at each stage of the loan for maximum profitability. While the invention has been described in terms of various specific embodiments, those skilled in the art will recognize that the invention can be practiced with modification within the spirit and scope of the claims.

What is claimed is:

1. A method for generating customer leads for use by dealers attempting to sell a product to a plurality of customers using a computer coupled to a database, the customer leads provided to the dealers through an auction process by a business entity engaged in a business of providing financing, said method comprising the steps of:

storing customer information within the database including age, gender, income and payment history for each of the plurality of customers including inactive customers, wherein an inactive customer is a customer that purchased a product from at least one of the dealers and is currently not a party to a loan for financing the purchased product;

applying propensity models using the computer to one or more customers stored within the database, the propensity models including an early termination model and a cross-selling model, the early termination model for predicting a probability of early termination of a loan by the one or more customers wherein early termination includes a likelihood a customer will terminate a loan provided by the dealer before a contract life of the loan expires by prepaying the loan, the cross-selling model for predicting a probability of cross-selling to a predicted early termination customer wherein cross-selling includes a likelihood a customer will purchase another product from the dealer to retain the early termination customer as an active customer of the dealer;

applying an activation model and a timing model using the computer to one or more customers stored within the database, the activation model for predicting a probability of activating the one or more customers stored within the database including a likelihood that an inactive customer will accept an offer to sell a product from the dealer and become an active customer, the timing model for predicting when the customers will accept the offer, wherein an active customer is a customer that is currently a party to a loan used for purchasing a product from at least one of the dealers;

generating for the business entity a customer lead list including customers satisfying the early termination model and the cross-selling model, or satisfying the activation model, wherein an early termination customer satisfying the cross-selling model is an early termination customer predicted to purchase another product from the dealer, and a customer satisfying the activation model is an inactive customer predicted to accept an offer to sell a product from the dealer;

auctioning the customer lead list to one or more dealers; and providing financing for the one or more dealers to a customer from the customer lead list that purchases a product from the one or more dealers, the financing provided by the business entity.

2. A method according to claim 1 wherein said step of applying propensity models further comprises the step of identifying early termination customers using a propensity model, wherein the propensity model identifies prepaying customers at least three months before the prepaying customer prepays the loan.

3. A method according to claim 1 wherein said step of applying an activation model and a timing model further comprises the step of identifying when customers will purchase from the dealer.

4. A method according to claim 1 wherein said step of storing customer information further comprises storing the customer information including customer information on at least one of active customer files and inactive customer files.

5. A method according to claim 1 wherein said step of generating a customer lead list further comprises the steps of:

clustering customers into customer groups according to customer characteristics; and identifying specific needs for each customer group.

6. A method according to claim 1 wherein said step of auctioning the customer lead list further comprises the steps of:

hosting the customer list on a web-based system; and providing dealers with access to the web-based system.

7. A method according to claim 1 wherein said step of auctioning the customer lead list further comprises the step of providing dealer access to the customer list through a telephone based system.

8. A method according to claim 1 wherein said step of auctioning the customer lead list further comprises the step of mailing the customer list to the dealers through at least one of electronic-mail, the postal service and a courier service.

9. A method according to claim 1 further comprising the step of providing results of customer contacts generated from the customer lead list to the database of customer information.

10. A method according to claim 1 wherein said step of providing the customer lead list further comprises the step of determining which customers will respond to a dealer initiated contact using a direct response model.

11. A system for generating customer leads for use by dealers attempting to sell a product to a plurality of customers, the customer leads provided to the dealers through an auction process by a business entity engaged in a business of providing financing, the system comprising:

one or more databases of customer information, the customer information including age, gender, income and payment history for each of the plurality of customers including inactive customers, wherein an inactive customer is a customer that purchased a product from at least one of the dealers and is currently not a party to a loan for financing the purchased product;

a server comprising a plurality of models including propensity models, an activation model, and a timing model, wherein the propensity models include at least one of an early termination model and a cross-selling model;

a network; and at least one computer connected to said server via said network, said server configured to:

apply the propensity models to one or more customers stored within the database, the early termination model for predicting a probability of early termination of a loan by the one or more customers wherein early termination includes a likelihood a customer will terminate a loan provided by the dealer before a contract life of the loan expires by prepaying the loan, the cross-selling model for predicting a probability of cross-selling to a predicted early termination customer wherein cross-selling includes a likelihood a customer will purchase another product from the dealer to retain the early termination customer as an active customer of the dealer, wherein an active customer is a customer that is currently a party to a loan used for purchasing a product from at least one of the dealers;

apply an activation model and a timing model to one or more customers stored within the database, the activation model for predicting a probability of activating the one or more customers stored within the database including a likelihood that an inactive customer will accept an offer to sell a product from the dealer and become an active customer, the timing model for predicting when the customers will accept the offer;

generate for the business entity a customer lead list including customers satisfying the early termination model and the cross-selling model, or satisfying the activation model, wherein an early termination customer satisfying the cross-selling model is an early termination customer predicted to purchase another product from the dealer, and a customer satisfying the activation model is an inactive customer predicted to accept an offer to sell a product from the dealer;

provide the customer lead list to one or more dealers selected through the auction process; and determine that financing is to be provided by the business entity for the one or more dealers to a customer from the customer lead list that purchases a product from the one or more dealers.

12. A system according to claim 11 wherein said server is configured to identify potential customers using a propensity model.

13. A system according to claim 11 wherein said server is configured to predict when the customers will respond to the offer using a timing model.

14. A system according to claim 11 wherein said database comprises data corresponding to active and inactive customer files.

15. A system according to claim 11 wherein said server is configured to:
 cluster customers into customer groups according to customer characteristics; and
 identify specific needs for each customer group.

16. A system according to claim 11 wherein said server is configured to provide dealer access to said system through said network.

17. A system according to claim 11 wherein said server is configured to provide the customer lead list through a telephone by at least one of a voice responsive system where a dealer enter spoken customer list information and a menu system where a dealer enters customer list information using touch keys of a telephone.

18. A system according to claim 11 wherein said server is configured to generate a mailing of the customer lead list to the dealers through at least one of electronic-mail and printed mailings for delivery by either of a postal service and a courier service.

19. A system according to claim 11 wherein said server is configured to upload to said database results of dealer initiated contacts with customers included on the customer lead list.

20. A system according to claim 11 wherein said server is configured to determine which customers will respond to a dealer initiated contact using a direct response model.

21. A computer for generating customer leads for use by dealers attempting to sell a product to a plurality of customers, the computer having a processor and a display, the computer coupled to a database, the customer leads provided to the dealers through an auction process by a business entity engaged in a business of providing financing, the computer programmed to:

store customer information within the database including age, gender, income and payment history for each of the plurality of customers including inactive customers, wherein an inactive customer is a customer that purchased a product from at least one of the dealers and is currently not a party to a loan for financing the purchased product;

apply propensity models to one or more customers stored within the database, the propensity models including an early termination model and a cross-selling model, the early termination model for predicting a probability of early termination of a loan by the one or more customers wherein early termination includes a likelihood a customer will terminate a loan provided by the dealer before a contract life of the loan expires by prepaying the loan, the cross-selling model for predicting a probability of cross-selling to a predicted early termination customer wherein cross-selling includes a likelihood a customer will purchase another product from the dealer to retain the early termination customer as an active customer of the dealer, wherein an active customer is a customer that is currently a party to a loan used for purchasing a product from at least one of the dealers;

apply an activation model and a timing model to one or more customers stored within the database, the activation model for predicting a probability of activating the one or more customers stored within the database including a likelihood that an inactive customer will accept an offer to sell a product from the dealer and become an active customer, the timing model for predicting when the customers will accept the offer;

generate for the business entity a customer lead list including customers satisfying the early termination model and the cross-selling model, or satisfying the activation model, wherein an early termination customer satisfying the cross-selling model is an early termination customer predicted to purchase another product from the dealer, and a customer satisfying the activation model is an inactive customer predicted to accept an offer to sell a product from the dealer; and determine that financing is to be provided by the business entity for one or more dealers selected through the auction process to a customer from the customer lead list that purchases a product from the one or more dealers.

22. A computer according to claim 21 wherein to generate a customer lead list, said computer displays a computer generated screen of potential customers.

23. A computer according to claim 21 wherein the database comprises data corresponding to both active and inactive customer information.

24. A computer according to claim 21 wherein to generate a customer lead list, said computer displays a computer generated screen prompting a user to select customer characteristics for clustering customers into customer groups.

25. A computer according to claim 21 further programmed to display a computer generated screen prompting a user to select to provide the customer lead list to a dealer using at least one of electronic-mail and printed mailings for delivery by either of a postal service and a courier service.

26. A database for generating customer leads for use by dealers attempting to sell a product to a plurality of customers, the customer leads provided by a business entity to dealers selected through an auction process, the business entity engaged in a business of providing financing, said database comprising:
  data corresponding to customer information including age, gender, income and payment history for each of the plurality of customers including inactive customers, wherein an inactive customer is a customer that purchased a product from at least one of the dealers and is currently not a party to a loan for financing the purchased product;
  data corresponding to applying propensity models to one or more customers stored within the database, the propensity models including an early termination model and a cross-selling model, the early termination model for predicting a probability of early termination of a loan by the one or more customers wherein early termination includes a likelihood a customer will terminate a loan provided by the dealer before a contract life of the loan expires by prepaying the loan, the cross-selling model for predicting a probability of cross-selling to a predicted early termination customer wherein cross-selling includes a likelihood a customer will purchase another product from the dealer to retain the early termination customer as an active customer of the dealer, wherein an active customer is a customer that is currently a party to a loan used for purchasing a product from at least one of the dealers;
  data corresponding to applying an activation model and a timing model using the computer to one or more customers stored within the database, the activation model for predicting a probability of activating the one or more customers stored within the database including a likelihood that an inactive customer will accept an offer to sell a product from the dealer and become an active customer, the timing model for predicting when the customers will accept the offer;
  data corresponding to generating for the business entity a customer lead list including customers satisfying the early termination model and the cross-selling model, or satisfying the activation model, wherein an early termination customer satisfying the cross-selling model is an early termination customer predicted to purchase another product from the dealer, and a customer satisfying the activation model is an inactive customer predicted to accept an offer to sell a product from the dealer; and
  data corresponding to determining that financing is to be provided by the business entity for one or more dealers selected through the auction process to a customer from the customer lead list that purchases a product from the one or more dealers.

27. A database according to claim 26 wherein said data corresponding to applying propensity models comprises data corresponding to a probability that the customer will to respond to an offer.

28. A database according to claim 26 wherein said data corresponding to applying an activation model and a timing model comprises data corresponding to a probability that the customer will respond to an offer at any one of user selected times.

29. A database according to claim 26 further comprising data corresponding to customer characteristics used for clustering customers.

30. A computer program embodied on a computer readable medium for generating customer leads for use by dealers attempting to sell a product to a plurality of customers, the customer leads provided to the dealers through an auction process by a business entity engaged in a business of providing financing, said program comprising at least one code segment that prompts a user to input customer information and then:
  stores the customer information within a database including age, gender, income and payment history for each of the plurality of customers including inactive customers, wherein an inactive customer is a customer that purchased a product from at least one of the dealers and is currently not a party to a loan for financing the purchased product;
  applies propensity models using the computer to one or more customers stored within the database, the propensity models including an early termination model and a cross-selling model, the early termination model for predicting a probability of early termination of a loan by the one or more customers wherein early termination includes a likelihood a customer will terminate a loan provided by the dealer before a contract life of the loan expires by prepaying the loan, the cross-selling model for predicting a probability of cross-selling to a predicted early termination customer wherein cross-selling includes a likelihood a customer will purchase another product from the dealer to retain the early termination customer as an active customer of the dealer, wherein an active customer is a customer that is currently a party to a loan used for purchasing a product from at least one of the dealers;
  applies an activation model and a timing model using the computer to one or more customers stored within the database, the activation model for predicting a probability of activating the one or more customers stored within the database including a likelihood that an inactive customer will accept an offer to sell a product from the dealer and become an active customer, the timing model for predicting when the customers will accept the offer;
  generates for the business entity a customer lead list including customers satisfying the early termination model and the cross-selling model, or satisfying the activation model, wherein an early termination customer satisfying the cross-selling model is an early termination customer predicted to purchase another product from the dealer, and a customer satisfying the activation model is an inactive customer predicted to accept an offer to sell a product from the dealer; and
  determines that financing is to be provided by the business entity for one or more dealers selected through the auction process to a customer from the customer lead list that purchases a product from the one or more dealers.

31. A computer program according to claim 30 further comprising a code segment that records customer information including records of active and inactive customers.

32. A computer program according to claim 30 further comprising a code segment that stores a plurality of rules for clustering customer information.

33. A computer readable program according to claim 32 further comprising a code segment that stores records of clustered customer groups.

34. Apparatus for generating customer leads for use by dealers attempting to sell a product to a plurality of customers, the customer leads provided by a business entity to dealers selected through an auction process, the business entity engaged in a business of providing financing, the apparatus comprising:

means for storing customer information within a database, the customer information including age, gender, income and payment history for each of the plurality of customers including inactive customers, wherein an inactive customer is a customer that purchased a product from at least one of the dealers and is currently not a party to a loan for financing the purchased product;

means for applying propensity models to one or more customers stored within the database, the propensity models including an early termination model and a cross-selling model, the early termination model for predicting a probability of early termination of a loan by the one or more customers wherein early termination includes a likelihood a customer will terminate a loan provided by the dealer before a contract life of the loan expires by prepaying the loan, the cross-selling model for predicting a probability of cross-selling to a predicted early termination customer wherein cross-selling includes a likelihood a customer will purchase another product from the dealer to retain the early termination customer as an active customer of the dealer;

means for applying an activation model and a timing model to one or more customers stored within the database, the activation model for predicting a probability of activating the one or more customers stored within the database including a likelihood that an inactive customer will accept an offer to sell a product from the dealer and become an active customer, the timing model for predicting when the customers will accept the offer, wherein an active customer is a customer that is currently a party to a loan used for purchasing a product from at least one of the dealers;

means for generating for the business entity a customer lead list including customers satisfying the early termination model and the cross-selling model, or satisfying the activation model, wherein an early termination customer satisfying the cross-selling model is an early termination customer predicted to purchase another product from the dealer, and a customer satisfying the activation model is an inactive customer predicted to accept an offer to sell a product from the dealer;

means for delivering the customer lead list to at least one dealer selected through the auction process; and means for determining that financing is to be provided by the business entity for the at least one dealer to a customer from the customer lead list that purchases a product from the at least one dealer.

35. Apparatus according to claim 34 wherein said means for generating a customer lead list comprises means for clustering groups of customers based on a selected set of customer characteristics.

36. Apparatus according to claim 34 wherein said means for delivering the customer lead list comprises means for e-mailing the potential customer list to the dealer.

37. Apparatus according to claim 34 wherein said means for delivering the customer lead list comprises means for transmitting the customer lead list to the dealer.

* * * * *